US009785795B2

(12) United States Patent
Grondin et al.

(10) Patent No.: US 9,785,795 B2
(45) Date of Patent: Oct. 10, 2017

(54) IDENTIFYING AND SECURING SENSITIVE DATA AT ITS SOURCE

(71) Applicant: Informatica LLC, Redwood City, CA (US)

(72) Inventors: Richard Grondin, Sainte-Julie (CA); Rahul Gupta, Dublin, CA (US)

(73) Assignee: Informatica, LLC, Redwood City, CA (US)

( * ) Notice: Subject to any disclaimer, the term of this patent is extended or adjusted under 35 U.S.C. 154(b) by 158 days.

(21) Appl. No.: 14/705,718

(22) Filed: May 6, 2015

(65) Prior Publication Data

US 2015/0324606 A1    Nov. 12, 2015

Related U.S. Application Data

(60) Provisional application No. 61/991,477, filed on May 10, 2014, provisional application No. 62/144,327, filed on Apr. 7, 2015.

(51) Int. Cl.
*G06F 3/00* (2006.01)
*G06F 21/62* (2013.01)
(Continued)

(52) U.S. Cl.
CPC ........ *G06F 21/6227* (2013.01); *G06F 3/0482* (2013.01); *G06F 3/04842* (2013.01);
(Continued)

(58) Field of Classification Search
CPC .. G06Q 30/06; G06Q 50/16; G06F 17/30598; G06F 17/30876; G06F 21/6227;
(Continued)

(56) References Cited

U.S. PATENT DOCUMENTS 8,286,253 B1*  10/2012  Lu ................. G06F 21/6218
                                                                726/26
2007/0287473 A1* 12/2007  Dupray .............. H04W 4/02
                                                                455/456.1
(Continued)

OTHER PUBLICATIONS

Cooley, A., "InfoSphere Guradium," IBM DeveloperWorks, Jul. 30, 2010, 5 pages, [Online] [Retrieved on Sep. 11, 2015] Retrieved from the Internet<URL:http://www.ibm.com/developerworks/data/library/dmmag/DMMag_2010_Issue3/FeatureGuardium/>.
(Continued)

*Primary Examiner* — Baotran N To
*Assistant Examiner* — Sayed Beheshti Shirazi
(74) *Attorney, Agent, or Firm* — Amardeep S. Grewal; Reed Smith LLP

(57) ABSTRACT

A data management service identifies sensitive data stored on enterprise databases according to record classification rules that classify a data record as having a sensitive data type if the data record includes fields matching at least one of the record classification rules. The data management service determines assessment scores for enterprise databases according to sensitive data records and protection policies on the enterprise databases. The data management service provides an interface that groups enterprise databases having common attributes or common sensitive data types and indicates aggregated assessment scores for the groups of enterprise databases. Through the interface with the grouped enterprise databases, an administrator apply protection policies to enterprise databases. To apply the protection policy, the data management service applies the protection policy to a source database from which dependent enterprise databases access the sensitive database.

21 Claims, 38 Drawing Sheets

(51) Int. Cl.
*H04L 29/06* (2006.01)
*G06F 17/30* (2006.01)
*G06F 3/0484* (2013.01)
*G06F 3/0482* (2013.01)

(52) U.S. Cl.
CPC .. *G06F 17/30598* (2013.01); *G06F 17/30876* (2013.01); *G06F 21/6245* (2013.01); *H04L 63/205* (2013.01)

(58) Field of Classification Search
CPC .............. G06F 21/6245; G06F 3/0482; G06F 3/04842; H04L 63/205
USPC .......................................... 726/1, 25, 26, 27
See application file for complete search history.

(56) References Cited

U.S. PATENT DOCUMENTS

| | | | | |
|---|---|---|---|---|
| 2010/0011000 | A1* | 1/2010 | Chakra | G06F 19/322 707/E17.005 |
| 2010/0241595 | A1* | 9/2010 | Felsher | G06F 19/322 705/400 |
| 2010/0275263 | A1* | 10/2010 | Bennett | G06F 21/577 726/25 |
| 2011/0055167 | A1* | 3/2011 | Howey | G06F 17/30498 707/687 |
| 2013/0253979 | A1* | 9/2013 | Williams | G06Q 10/0635 705/7.28 |

OTHER PUBLICATIONS

European Extended Search Report, European Application No. 15167178.1, Sep. 24, 2015, 9 pages.
European Extended Search Report, European Application No. 15167217.7, Oct. 16, 2015, 10 pages.
Anonymous, "2013 Cost of Data Breach Study: Global Analysis," Ponemon Institute, May 28, 2013, pp. 1-22, [Online] [Retrieved on Oct. 4, 2015] Retrieved from the Internet<URL:http://www.ponemon.org/local/upload/file/2013 Report Global CODB Final 5-2.pdf>.
Anonymous, "Managing Risk to Sensitive Data with SecureSphere," Imperva.com, Sep. 30, 2012, 9 pages, [Online] [Retrieved on Sep. 11, 2015] Retrieved from the Internet<URL:http://www.imperva.com/docs/wp_managing-risk-to-sensitive-data-with-securesphere.pdf>.
Ghani, H.. et al., "Quantitative Assessment of Software Vulnerabilities Based on Economic-Driven Security Metrics," 2013 International Conference on Risks and Security of Internet and Systems (CRISIS), IEEE, Oct. 23, 2013, 8 pages.
Mogull, R., "Understanding and Selecting a Database Activity Monitoring Solution," Arhive.org, May 1, 2013, 24 pages, [Online] [Retrieved on Sep. 11, 2015] Retrieved from the Internet<URL:https://web.artive.org/web/20130501221003/https://securosis.com/assets/library/reports/DAM-Whitepaper-final.pdf>.
Scarfone, K. et al., "The Common Configuration Scoring System (CCSS): Metrics for Software Security Configuration Vulnerabilities," NIST Interagency Report 7502, Dec. 31, 2010, 42 pages, [Online] [Retrieved on Oct. 7, 2015] Retrieved from the Internet<URL:http://csrc.nist.gov/publications/nistir/ir7502/nistir-7502_CCSS.pdf>.
Stoneburner, G. et al., "Risk Management Guide for Information Technology Systems," NIST Special Publication 800-30, Computer Security Division Information Technology Laboratory National Institute of Standards and Technology, US, No. 80030, Jul. 1, 2002, pp. 1-55.

* cited by examiner

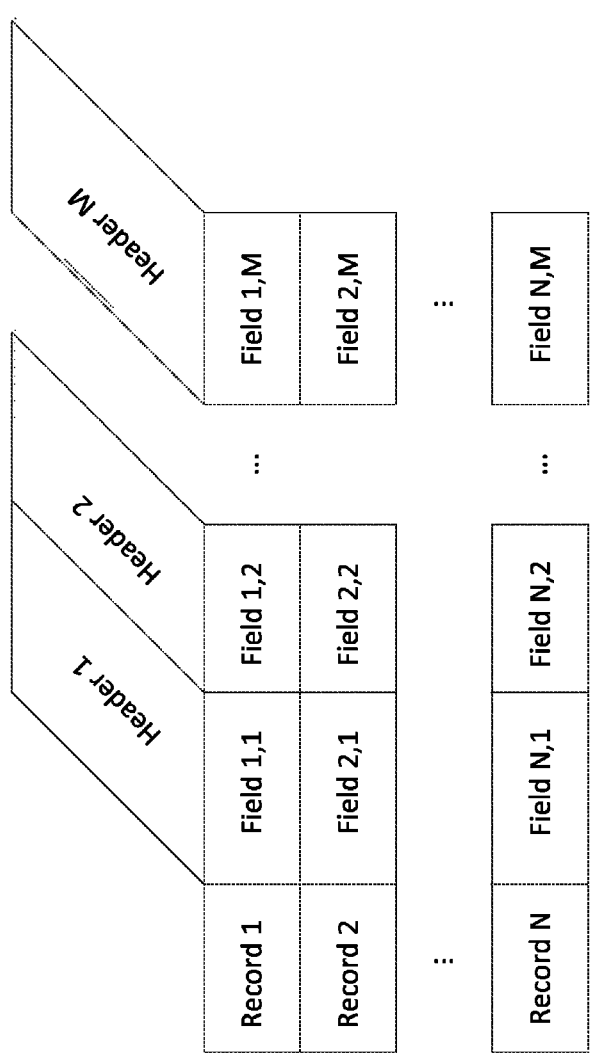

View the Data Store details and click edit to modify Data Stores.

Connection Properties

| | |
|---|---|
| Name: | Finance |
| Description: | |
| Repository type: | PowerCenter Repository |
| Data Store Type | Oracle 11g |
| Host Name: | invbx61lin40 |
| Port: | 1521 |
| Service Name: | ora11ginformatica.com |
| Sid: | |
| Connection String: | INFA_CRA11g |
| Username: | PCRS169_Ora |
| Password: | ***** |
| Secure JDBC Parameters: | |
| Domain Name: | Domain_invr281m169 |
| PowerCenter Integration Service Name: | PCIS |
| PowerCenter Repository Service Name: | PCRS |
| PowerCenter Username: | Administrator |
| PowerCenter Password: | ***** |
| PowerCenter Folder Name: | |
| Node Host: | invr281m169 |
| Node Port: | 6005 |
| Site Key Location: | |
| Last Modified By: | Administrator |
| Last Modified On: | |

Additional Properties

| | |
|---|---|
| Merged Data Stores: | |
| Data Owner: | Admin |
| Location: | NA |
| Application Group: | Default |
| Security Group(s): | Everyone |
| Department: | transport |

FIG. 4A

New Data Store

Specify data store type and specify details:

Connection Properties

| | |
|---|---|
| Name: | New Data Store |
| Description: | |
| Repository Type: | ▾ |
| Data Store Type: | ▾ |

Additional Properties

| | |
|---|---|
| Data Owner: | |
| Location: | ▾ |
| Application Group: | ▾ |
| Security Group(s): | 0 Groups Selected ▾ |
| Department: | |

FIG. 4B

New Policy

① ──── ②

Specify Properties  Data Domain Match
and Assign Domains

Select the data domain match options:

○ Match Any
○ Match All
◉ Custom

Specify one or more data match conditions.

Data Match Condition 1

Data Domain is | AccountNumber ▽ |   [ + ]  [ × ]

FIG. 7C

Scans

18 Scans

| | Name | Data Stores | Policies | Domains | Scan Status |
|---|---|---|---|---|---|
| 18 Scans | | | | | |
| 11 ⚠ Failed | | | | | |
| ☐ | Financials_Scan<br>Last updated on 1/5/2015,7:12:41 PM by Administrator | 1 | 1 | 0/18 | Completed |
| ☐ | HealthCare_scam<br>Last updated on 1/5/2015,7:25:47 PM by Administrator | 1 | 1 | 0/8 | Completed |
| ☐ | Marketing_scan<br>Last updated on 1/5/2015,7:02:22 PM by Administrator | 1 | 1 | 0/5 | Completed |
| ☐ | Now Scan<br>Last updated on 1/7/2015,4:58:57 AM by Administrator | 4 | 1 | 0/0 | Failed |
| ☐ | Sales<br>Last updated on 1/5/2015,12:13:02 PM by Administrator | 1 | 1 | 0/14 | Completed |
| ☐ | Sales DB scan<br>Last updated on 1/5/2015,2:34:13 PM by Administrator | 1 | 1 | 0/14 | Failed |
| ☐ | Sales DB scan2<br>Last updated on 1/5/2015,2:01:40 PM by Administrator | 1 | 1 | 0/14 | Failed |
| ☐ | Sales scan 107<br>Last updated on 1/5/2015,4:58:18 PM by Administrator | 1 | 1 | 0/14 | Failed |
| ☐ | Sales_DS_scan<br>Last updated on 1/5/2015,12:58:09 PM by Administrator | 28 | 1 | 0/14 | Failed |
| ☐ | Sales_DS_scan1<br>Last updated on 1/5/2015,1:20:19 PM by Administrator | 28 | 1 | 0/14 | Failed |
| ☐ | TransportPCRSScan<br>Last updated on 1/29/2015,1:37:05 PM by Administrator | 1 | 1 | 0/18 | Completed |

[New]

FIG. 8A

Edit Financials_Scan

① —— ② —— ③
Define & Connect   Assign Policy   Schedule

Select Data Store Type and Specify scan options.

Name: [Financials_Scan]

Description: [ ]

Repository Type: [PowerCenter Repository ▽]

Data Stores: [ ▽]

Scan Options: ☑ Include Data Stores and catalog information
☑ Proliferation

FIG. 8B

Edit Financials_Scan

① Define & Connect —— ② Assign Policy —— ③ Schedule

Select policies for this scan.

| | Name | Description | Domains |
|---|---|---|---|
| ☐ | Custom | undefined | 8 |
| ☐ | PCI | undefined | 6 |
| ☐ | PHI | undefined | 14 |
| ◊ | PII | undefined | 18 |
| ☐ | Rohit Policy | PCI | 0 |

1 Policies Selected

5 Assign Policies

FIG. 8C

Edit Financials_Scan

① ──── ② ──── ③

Define & Connect    Assign Policy    Schedule

○ Run Now
◉ Schedule Scan

Start Date: 03/17/2015 □

Start Time: 11:17 AM ⊙

□ Recurrences

FIG. 8D

Alert Rules

6 Alert Rules

| | Name | Alert Conditions | Severity | Email Notification | Schedule |
|---|---|---|---|---|---|
| ☐ | AlertRule1<br>Last updated on 1/6/2015,5:47:57 PM by Administrator | 1 | High | No | Run Now |
| ☐ | AlertRule2<br>Last updated on 1/6/2015,6:56:06 PM by Administrator | 1 | Medium | No | Run Now |
| ☐ | AlertRule3<br>Last updated on 1/6/2015,7:11:40 PM by Administrator | 1 | Low | No | Yearly |
| ☐ | AlertRule4<br>Description<br>Last updated on 1/5/2015,8:31:39 PM by Administrator | 1 | High | No | Weekly |
| ☐ | Now Alert Rule<br>Last updated on 2/11/2015,2:08:12 PM by Administrator | 1 | Informational | No | Run Now |
| ☐ | New AlertReleased<br>Last updated on 3/12/2015,4:14:18 PM by Administrator | 1 | High | Yes | Weekly |

FIG. 9A

New Alert Rule

① Define —— ② Notify

Specify details for new alert creation.

Name: [New Alert Rule]

Description: [ ]

Severity: [High ▽]

Specify alert conditions:

| Alert Condition | Operator | Value | |
|---|---|---|---|
| [Country ▽] | [Equals to ▽] | [VaticanCity ▽] | ⊗ ⊕ |

Country
Location
Data Store
Policy
Protection Status
Risk Cost
Risk Store
Sensitive Records
Severity
Target Country
Target Location

FIG. 9B

Alert Properties

Alert Id: 25
Rule Name: Test High Risk
Description:
Date: 3/17/2015, 11:24:26 AM
Severity: High

1 Alert Conditions

| | | |
|---|---|---|
| Risk Score | Greater than | 5 |

117 Data Stores matching Alert Rule.

| Data Stores | Risk Score | Protection Status | Sensitive Records | Severity | Data Value | Owner |
|---|---|---|---|---|---|---|
| Sales/DB2114 | 50 | 0% | 0 | Restricted | 0 | Admin |
| Sales/ORACLE107 | 50 | 0% | 0 | Restricted | 0 | Admin |
| Sales/DB2113 | 50 | 0% | 0 | Restricted | 0 | Admin |
| Sales/MSSQL100 | 50 | 0% | 0 | Restricted | 0 | Admin |
| Sales/Ora.2 | 50 | 0% | 0 | Restricted | 0 | Admin |
| Sales/DB2111 | 50 | 0% | 0 | Restricted | 0 | Admin |
| Sales/DB2173 | 50 | 0% | 1000 | Restricted | 0 | Admin |
| Sales/Db2174 | 50 | 0% | 0 | Restricted | 0 | Admin |
| Sales/Oracle40 | 50 | 0% | 0 | Restricted | 0 | Admin |
| Sales/SQL1 | 50 | 0% | 0 | Restricted | 0 | Admin |
| Sales/SQL3 | 50 | 0% | 0 | Restricted | 0 | Admin |
| Sales/MSSQL03 | 50 | 0% | 0 | Restricted | 0 | Admin |

FIG. 9D

IDENTIFYING AND SECURING SENSITIVE DATA AT ITS SOURCE

CROSS-REFERENCE TO RELATED APPLICATIONS

This application claims the benefit of U.S. Provisional Application No. 61/991,477, filed May 10, 2014, and U.S. Provisional Application No. 62/144,327, filed Apr. 7, 2015, both of which are incorporated by reference in their entirety.

BACKGROUND

Technical Field

The subject matter described herein relates to visualizing data to facilitate identification and protection of sensitive data.

Description of Related Art

Modern day computer networks store numerous types of data, including sensitive data. Sensitive data contains information that could cause harm to individuals and businesses if compromised. Example types of sensitive data include health care records, financial data, and personal identification information. Because the consequences of exposing sensitive data are severe, network administrators apply one or more protection policies to the sensitive data as an additional layer of security beyond a database's standard protections.

Identifying sensitive data may be a challenge for a number of reasons. Within a computer network, databases store countless data records, which are incessantly modified, added, and deleted. To ensure that the locations of sensitive data are known, frequent scans may be used. However, frequent scans are not practical if the scans are computationally intensive, as a scan of each individual database record would be. Accordingly, computationally intensive scans the frequency of scans and the accuracy of the network administrator's sensitive data knowledge. Additionally, not all sensitive data records are of equal importance. A network administrator may not have time to examine every database in a network. When examining databases without prioritization, a network administrator may miss critical databases that present a high overall level of risk.

Furthermore, multiple databases may access sensitive data records. Protecting all copies of a data record may not be practical if the network administrator cannot directly apply protection policies to a database. For example, an external database controlled by another entity accesses a database containing sensitive data, to the network administrator cannot instruct the external database to apply the protection policy.

SUMMARY

A data management service identifies sensitive data stored on enterprise databases according to record classification rules that classify a data record as having a sensitive data type if the data record includes fields matching at least one of the record classification rules. Using the sensitive data types, administrators may target sensitive data with a protection policy appropriate for the sensitive data type.

The data management service determines assessment scores for enterprise databases according to sensitive data records and protection policies on the enterprise databases. Example assessment scores for enterprise databases indicate a proportion of sensitive records that are unprotected, a cost or value of the sensitive data, and an aggregate measurement of risk. Using the assessment scores, an administrator may determine which enterprise databases to target for protection.

The data management service provides an interface that groups enterprise databases having common attributes and indicates aggregated assessment scores for the groups of enterprise databases. Through the interface with the grouped enterprise databases, an administrator may identify trends in database protection and target protection policies to multiple databases. When applying a protection policy, the data management service applies the protection policy to a source database from which dependent enterprise databases access the sensitive database. Once data records are protected at the source database, the secured data proliferates to the dependent databases. By securing enterprise data at the source, the data management service beneficially reduces processing compared to applying a protection policy at the dependent databases.

The disclosed embodiments include a computer-implemented method (e.g., comprising steps performed by one or more processors) for discovering and protecting sensitive data within an enterprise, a non-transitory computer-readable medium comprising instructions executable by a processor to perform the steps for discovering and protecting sensitive data within an enterprise, and a system including one or more processors and the non-transitory computer-readable medium for discovering and protecting sensitive data within an enterprise. The steps include obtaining database descriptions of enterprise databases, each database description indicating a database attribute of the corresponding database; obtaining a record classification rule for a sensitive data type, the record classification rule specifying at least one field type; identifying sensitive data records of the sensitive data type by identifying data records having the at least one field type specified by the record classification rule; determining assessment scores for the enterprise databases, an assessment score determined from a number of identified sensitive data records in the corresponding database; generating status indicators for groups of enterprise databases each having a common database attribute, a status indicator for an enterprise group reflecting a total number of identified sensitive data records in enterprise databases having membership in the enterprise group; providing an interface comprising the generated status indicators; receiving via the user interface a selection of one of the generated status indicators and a selection of a protection policy; and applying the selected protection policy to sensitive data records of an enterprise database having membership in the enterprise group corresponding to the selected status indicator.

The features and advantages described in this summary and the following description are not all inclusive and, in particular, many additional features and advantages will be apparent in view of the drawings, specification, and claims. Moreover, it should be noted that the language used in the specification has been principally selected for readability and instructional purposes, and may not have been selected to delineate or circumscribe the disclosed subject matter.

BRIEF DESCRIPTION OF DRAWINGS

The disclosed embodiments have other advantages and features which will be more readily apparent from the detailed description and the accompanying figures. A brief introduction of the figures is below.

FIG. 1B is a conceptual diagram of an example table within an enterprise database, in accordance with an embodiment.

FIG. 4A is an example interface illustrating properties of an enterprise database, in accordance with an embodiment.

FIGS. 4B and 4C are example interfaces for obtaining attributes of an enterprise database, in accordance with an embodiment.

FIGS. 7B and 7C are example interfaces for configuring a record classification rule, in accordance with an embodiment.

FIG. 8A is an example interface illustrating example data scans, in accordance with an embodiment.

FIGS. 8B through 8D are example interfaces for configuring a data scan, in accordance with an embodiment.

FIG. 9A is an example interface illustrating example alert rules, in accordance with an embodiment.

FIGS. 9B and 9C are example interfaces for configuring an alert rule, in accordance with an embodiment.

FIG. 9D is an example interface illustrating alerts generated by alert rules, in accordance with an embodiment.

DETAILED DESCRIPTION

The figures and the following description relate to particular embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. Alternative embodiments of the structures and methods illustrated herein may be employed without departing from the principles described herein.

System Architecture

Figure 1A:
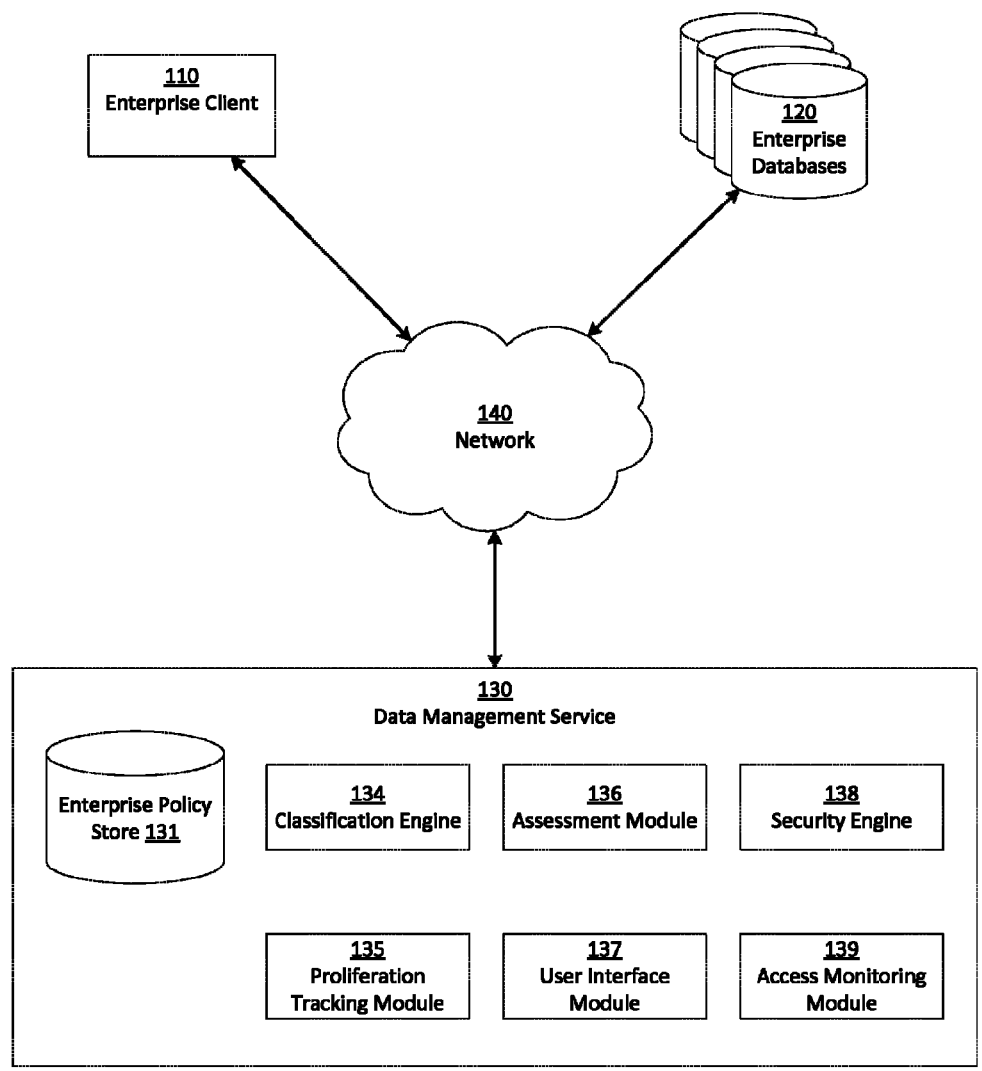
FIG. 1A is a block diagram of a networked computing environment for securing data, in accordance with an embodiment.

FIG. 1 is a block diagram of a networked computing environment for securing data, in accordance with an embodiment. The entities of the networked environment include an enterprise client 110, enterprise databases 120, a data management service 130, and a network 140. Although single instances of the enterprise client 110, data management service 130, and network 140 are illustrated, multiple instances may be present. For example, multiple enterprise clients 110 may administer the enterprise databases 120 through the data management service 130. The functionalities of the entities may be distributed among multiple instances. For example, the data management service 130 is provided by a cloud computing service with multiple servers at geographically dispersed locations implementing data management service 130.

An enterprise client 110 refers to a computing device that accesses the data management service 130 through the network 140. By accessing the data management service 130, the enterprise client 110 may monitor the enterprise databases 120 and configure enterprise policies controlling data access and securing data through protection policies such as encryption and masking Example enterprise policies are described with respect to the enterprise policy store 131.

Example enterprise clients 110 include a desktop computer, a laptop, a tablet, a mobile device, a smart television, a wearable device, or any other computer. The enterprise client 110 may contain software such as a data management application provided by the data management service 130 and native to the enterprise client's operating system or a web browser to access a web data management application provided by the data management server 130. Through these data management applications, an authorized user (also referred to as an administrator) may view the status of enterprise databases 120 and configure (e.g., add, modify, remove) enterprise policies. The enterprise client 110 may include a display device (e.g., a screen, a projector) to present the data management application and an input device (e.g., a touchscreen, a mouse, a keyboard, a touchpad) to enable interaction between the administrator and the data management application.

Enterprise databases 120 store data of the enterprise. Enterprise databases 120 may be stored on servers owned by the enterprise or a third party. For example, a cloud service provider provides an enterprise database 120 using multiple servers at multiple datacenters. Through an enterprise client 110, an administrator provides the data management service 130 with credentials to access an enterprise database 120. An enterprise database 120 includes one or more data tables comprised of data records. A data record has one or more fields.

Turning to FIG. 1B, illustrated is a conceptual diagram of an example table within an enterprise database 120, in accordance with an embodiment. Each of the N records has M fields. A field stores data, including numerical data, textual data, image data, audio data, video data, or a combination thereof. A field typically stores data encoded (e.g., using an ASCII integer) into a low-level data format (e.g., binary) having a direct correspondence to a physical state of hardware in the database. For example, a binary value corresponds to the presence or absence of electrical charge stored in a node of a memory device (e.g., dynamic random access memory, a flash memory, a disk drive). The fields under a header have a common semantic interpretation, which is described by metadata of the corresponding header. In the illustrated embodiment, the table is a two-dimensional array, the records and headers are indexed, and a field may be accessed by indicating the indices of the corresponding record and header. However, other database may be implemented with different structures such as a hash table or tree. The organization of data in the software description of a table may differ from the physical organization of the data stored on hardware.

Turning back to FIG. 1A, the network 140 enables communications among the entities connected thereto through one or more local-area networks and/or wide-area networks. The network 140 (e.g., the Internet) may use standard and/or custom wired and/or wireless communications technologies and/or protocols. The data exchanged over the network 140 can be encrypted or unencrypted. The network 140 may include multiple sub-networks to connect the enterprise client 110, enterprise databases 120, and the data management service 130.

The data management service 130 monitors and manages data on the enterprise databases 120. The data management service 130 may identify and classify sensitive data records, provide an interface illustrating sensitivity of enterprise databases 120, and apply protection policies to data records on enterprise databases 120. The data management service 130 includes an enterprise policy store 131, a classification engine 134, a proliferation tracking module 135, an assessment module 136, a user interface module 137, a security engine 138, and an access monitoring module 139. The functionality of the illustrated components may be distributed (in whole or in part) among a different configuration of modules. Some described functionality may be optional; for example, in one embodiment the data management service 130 does not include an access monitoring module 139.

The enterprise policy store 131 stores enterprise policies configured by an administrator through the enterprise client 110. Enterprise policies include database attributes, location attributes, field classification rules, record classification rules, scan settings, alert rules, and protection policies.

Database attributes describe an enterprise database 120. Example database attributes include a name, access credentials, a location of the database, and one or more enterprise groups associated with the enterprise database 120. An enterprise group is an enterprise department, division, subdivision, role, application group, or other subdivision within the enterprise's organizational structure or software architecture. Database attributes are described in further detail with respect to FIGS. 4A through 4C.

Location attributes describe the location of a database, and may include several levels of specificity (e.g., continent, region, country, state, province, city). Location attributes are described in further detail with respect to FIG. 5A.

Field classification rules are used to determine header types (also referred to as the data domain or field type) associated with fields in a column of data table in an enterprise database 120. Example header types include credit card number, birthdate, and social security information. Data of the same field type have the same semantic meaning but may have different formatting. For example, fields containing the data "(111) 111-1111" and "222.222.2222" both describe telephone numbers (a field type) in spite of having different formatting. Field classification rules are described in further detail with respect to FIGS. 6A through 6C.

Record classification rules are used to classify data records in a data table as having a sensitive data type. Data with the same sensitive data type may be covered by a similar set of industry standards and/or government regulations. Example sensitive data types include PCI (payment card industry) data, PHI (protected health information), PII (personally identifiable information), and HCM (human capital management) data. A sensitive data type may be associated with a data cost (e.g., monetary value per data record) and a severity band (e.g., public, internal, confidential, restricted). The data cost and severity band may be used to identify relative importance of sensitive data to an enterprise. In particular, the user interface module 137 may use the data cost and severity band to suggest enterprise databases 120 for protection. Record classification rules are described in further detail with respect to FIGS. 7A through 7D.

Scan settings define scans used to identify data as having a sensitive data type. An example scan identifies data of one or more selected sensitive data types on one or more selected enterprise databases 120. Scan settings are described in further detail with respect to FIGS. 8A through 8D.

Alert rules are used to identify enterprise databases 120 to be evaluated by an administrator or to identify suspicious activity on an enterprise database 120. Alert rules may be based on assessment scores, data protection status, or database access volume, for instance. An example alert identifies unprotected data having an assessment score (e.g., cost score, risk score) exceeding an assessment score threshold. Alert rules are described in further detail with respect to FIGS. 9A through 9C.

A protection policy indicates one or more protection actions applied to one or more data fields. A protection policy may apply to an entire enterprise database 120, data records in a particular data table, all fields of particular data records, or to particular fields in particular data records. Besides specifying the data protected by the protection policy, the protection policy describes protection actions (e.g., encryption, data masking, access blocking) and parameters for the protection action (e.g., an encryption key, a data masking schema, an authorized access list). Protection policies are described in further detail with respect to the security engine 138.

The classification engine 134 classifies data records into sensitive data types (or verifies that the data is not sensitive). To do so, the classification engine 134 takes as input headers of a data record and outputs one or more sensitive data types matching the headers of the data record as defined by a record classification rule. The classification engine 134 may also identify header types of a data table's fields using the header labels or by comparing the format of data in the fields to a pattern associated with the header type. The classification engine 134 is described in further detail with respect to FIG. 2A.

The proliferation tracking module 135 monitors data access and use by enterprise databases 120 to determine dependency relationships between the enterprise databases 120. The proliferation tracking module 135 identifies source databases and dependent databases retrieving data from the source databases according to the data access and use. In particular, if an enterprise database 120 consistently accesses another enterprise database 120 for a set of data records, then the accessing database is a dependent database. If an enterprise database 120 is accessed by other enterprise databases 120 for the data but does not in turn access other enterprise databases 120 to obtain the data records, then the enterprise database 120 is a source database. The proliferation tracking module 135 may discriminate between source and dependent databases based in part on relative volume of access traffic. For example, a dependent database may send updated data records or additional data records to a source database for merging, but the dependent database retrieves significantly more data records from the source database than the dependent database provides to the source database.

Some dependent databases access data records from another dependent database. A database that accesses a data record from the source database is referred to as a first-layer dependent database. A database accessing an nth-layer dependent database is an (n+1)th-layer dependent database. The proliferation tracking module 135 divides the enterprise databases 120 into layers of databases (where the source database is the zeroth layer) according to dependencies between databases. The proliferation tracking module 135 identifies an outer-layer dependent database as a database predominantly accessing data records from a database in a next inner layer. Database dependencies are illustrated in FIGS. 14A through 14D.

The assessment module 136 determines an assessment score for an enterprise database 120 according to a number of sensitive data records in the enterprise database 120 or a number of unprotected sensitive data records in the enterprise database 120. Unprotected sensitive data records refer to data records to which a protection policy has not been applied (e.g., by the security module 138). Protected sensitive data records refer to data records to which a protection policy has been applied. The assessment module may determine a proportion of unprotected sensitive data records, a risk score, or a cost score. The assessment module 136 is described in further detail with respect to FIG. 2B.

The user interface (UI) module 137 generates a graphical user interface that a user interacts with through software and input devices on the enterprise client 110. The user interface is provided to the enterprise client 110 through communication with the software of the enterprise client 110. Through the user interface, the user adds and modifies enterprise policies, views status indicators of enterprise databases 120, and applies protection policies to enterprise databases 120. The UI module 137 is described further with respect to FIG. 2C.

The security engine 138 obtains a selected enterprise database 120 and a selected protection policy and applies the selected protection policy the enterprise database 120. Example protection policies include encryption, masking, dynamic masking, blocking, and tokenization. Encryption refers to applying a cipher to data to render the data meaningless without reversing the encryption. Masking refers to performing obfuscation operations on data to render the data apparently inaccurate or meaningless. However, processes having a legitimate use for the masked data include logic to reverse the masking when manipulating the masked data. Dynamic masking refers to selectively masking data depending on the accessing user, device, or process. Blocking refers to denying access to a particular user, device, or process (a blacklist approach) or denying access to any user, device, or process that is not specifically authorized (a whitelist approach). Tokenization refers to replacing sensitive data with a reference to the actual sensitive values (e.g., at a source database). The security engine 138 may apply the protection policy to all fields of a data table, to fields in sensitive data records, to fields having a sensitive header type, or to fields having a sensitive header type within sensitive data records.

In one embodiment, the security engine 138 applies the protection policy by identifying an enterprise database 120 storing the data targeted by the protection policy. The security engine 138 then instructs propriety software (e.g., provided by the data management service 130) installed on the enterprise database 120 to apply the protection policy. Alternatively or additionally, the data management service 130 instructs native software on the enterprise database 120 to apply the protection policy. The security engine 138 does not necessarily apply the protection policy to all enterprise databases 120 having copies of the targeted data records. For example, the security engine 138 obtains the source database of the targeted data records (from the proliferation tracking module 135) and applies the protection policy to the source database.

In one embodiment, the security engine 138 automatically (e.g., according to rules) selects protection policies to apply to data according to properties of the data. For example, a sensitive data type is associated with a default protection policy that the security engine 138 applies in response to identifying the sensitive data type. As another example, the security engine 138 applies a default security policy (e.g., blocking) to unprotected sensitive data in response to determining that an assessment score of the data (e.g., risk score, cost score) equals or exceeds a score threshold. As a third example, the security engine 138 applies a default security policy (e.g., tokenization) to unprotected sensitive data in response to determining that the sensitive data has a particular sensitivity levels (e.g., confidential, restricted). The security engine 138 may apply default security policies in response to a command received from an enterprise client 110, in response to a data scan, or in response to an alert.

The monitoring module 139 obtains scan settings and scans enterprise databases 120 to identify sensitive data (or changes in sensitive data) having a sensitive data type indicated by the scan settings. The monitoring module 139 may run scan settings as prompted by a user or according to a schedule (e.g., one-time, routinely). Scan settings are described with respect to FIGS. 8A through 8D.

The monitoring module 139 obtains alert rules and scans enterprise databases 120 to determine whether the alert rule's conditions are met. If so, then the monitoring module 139 generates an alert. The monitoring module 139 scan for alerts periodically, in response to a change in an enterprise database 120, in response to a user request, or in response to availability of processing and bandwidth resources of the data management service 130. Alert rules are described in further detail with respect to FIGS. 9A through 9D.

Classification Engine

Figure 2A:
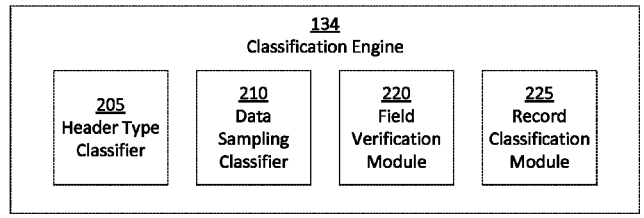
FIG. 2A is a block diagram of an example classification engine, in accordance with an embodiment

FIG. 2A is a block diagram of classification engine 134, in accordance with an embodiment. The classification engine 134 includes a header type classifier 205, a data sampling classifier 210, a field verification module 220, and a record classification module 225. The functionality of the classification engine 134 may be provided by additional, different, or fewer modules than those described herein.

The header type classifier 205 obtains a header associated with a field and determines whether the header has a field type according to a field classification rule. For example, the field classification rule includes one or more strings (e.g., "CreditCard", "Credit Card Number", "Card Number") for comparison with the header metadata. If a description of the header matches one of the strings, then the fields under the header match the field classification rule. As another example, the header includes metadata specifying a data format (e.g., four sets of four digits for a credit card number rule). If the header's data format matches a data pattern indicated by the field classification rule, then the fields under the header match the classification rule. The header type classifier 205 beneficially estimates a classification of data fields to beneficially reduce the computational cost of classifying fields under a header without sampling the fields.

The data sampling classifier 210 obtains field values under a header from one or more data records and determines whether the header has a field type according to a field classification rule. To obtain the field values, the data sampling classifier 210 samples the data table (e.g., first data records, last data records, random data records, uniformly spaced data records). The data sampling classifier 210 compares the sampled field values to the field classification rule and determines a number of field values meeting the classification rule. Based on the number of fields, the data sampling classifier 210 determines whether the header has the field type associated with the field classification rule.

The field classification rule may specify one or more sequences of character types (e.g., number, letter, punctuation), particular characters (e.g., dash, parenthesis). The specified sequence may include variable length portions (e.g., 3 to 4 numbers followed by 1 punctuation character, 1 to any number of letter characters). Field classification rules may also include preprocessing rules such as removal of punctuation or whitespace. Field classification rules may include cross-references to a dictionary (e.g., place names, address abbreviations, common surnames or forenames). For example, a field classification rule labels a field as a telephone number if the field includes two three-digit numbers followed by a four-digit number, where the numbers are delimited by punctuation or whitespace.

To determine whether the header has the field type associated with the field classification rule, the data sampling classifier 210 compares the number of sampled fields matching the field classification rule to one or more thresholds. In one embodiment, if the number of matching fields exceeds a verification threshold, then the data sampling classifier 210 determines that the header has the field type corresponding to the field classification rule. If the number of matching fields does not exceed the verification threshold but does exceed a rejection threshold, then the sampled data is submitted for further review through the field verification module 220. If the number of matching fields does not exceed the rejection threshold, then the header does not match the field classification rule. In other embodiments, the data sampling classifier 210 omits verification, omits automatic field type classification acceptance without verification, or omits automatic field type classification rejection without verification step. The data sampling classifier 210 beneficially estimates a classification of data fields to beneficially reduce the computational cost of classifying fields under a header without exhaustively testing the field for every data record under the header.

The field verification module 220 obtains sampled fields for verification by the data sampling classifier and presents the sampled fields to an administrator for verification. The administrator determines whether the sampled fields have the field type corresponding to the field classification module. The field verification module 220 may present fields that did and did not match the verification rule in equal parts to streamline review by the administrator. Alternatively or additionally, the field verification module 220 classifies the sampled fields by another method (e.g., using the header type classifier 205). Alternatively or additionally, the field verification module 220 submits the sampled fields for comparison to other field classification rules associated with the different type. If the sampled fields match the other field classification rules better (i.e., more matching fields), then the field verification module 220 determines that the sampled fields do not have the field type of the initial field classification rule.

The record classification module 225 obtains field types of a data record and determines whether the data record has a sensitive data type according to a record classification rule. In one embodiment, the record classification rule specifies one or more field types and Boolean logic for combining the field types. The Boolean logic may specify that a data record matches a data classification if the data record has all the specified field types, any of the specified field types, or a particular combination of field types. For example, the record classification module 225 classifies a data record as PII (a sensitive data type) if the data record includes the field type birthdate, the field type first name, the field type last name, and one of the field types social security number and resident alien number.

Assessment Module

Figure 2B:
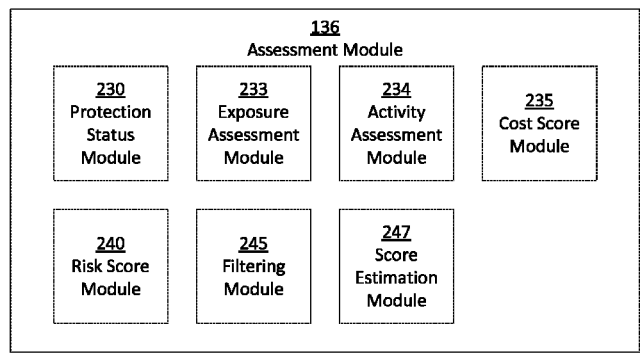
FIG. 2B is a block diagram of an example assessment module, in accordance with an embodiment.

FIG. 2B is a block diagram of assessment module 136, in accordance with an embodiment. The assessment module 136 includes a protection status module 230, an exposure assessment module 233, an activity assessment module 234, a cost score module 235, a risk score module 240, a filtering module 245, and a score estimation module 247. The functionality of the assessment module 136 may be provided by additional, different, or fewer modules than those described herein.

The protection status module 230 obtains an identification of an enterprise database 120 and determines an assessment score for the enterprise database 120. For example, the assessment score is a total count (e.g., of sensitive data records, of protected sensitive data records, of unprotected sensitive data records), or a percentage (e.g., of unprotected or protected sensitive data records out of sensitive data records or total data records, or a percentage of sensitive data records out of total data records). The protection status module 230 may determine the assessment score from a comparison of assessment scores over time. For example, a temporal assessment score indicates an assessment score for data modified or added during a time period. As another example, an assessment score indicates the change (e.g., in absolute or percentage terms) in an assessment score over a time period (e.g., day, month, quarter, year).

The exposure assessment module 233 obtains an identification of an enterprise database 120 and determines a user exposure score, which is an assessment score reflecting a number of users that may access an enterprise database 120. The exposure assessment module 233 identifies users that may access sensitive data in an enterprise database 120 and determines the user exposure score from the number of users that may access the sensitive data records. The user exposure score may be based on the whether the sensitive data are protected. For example, the user exposure score is the number of users that may access unprotected sensitive data fields. The user exposure score may be normalized relative to the total number of users that may access the database to determine a proportion or percentage of users that may access sensitive data or sensitive, unprotected data.

The activity assessment module 234 obtains an identification of an enterprise database 120 and determines an activity score, which is an assessment score reflecting user manipulation of data stored on the enterprise database 120. The activity score may indicate a count of a particular type of access (e.g., reads, writes, deletions) or a total count of overall data accesses (including all types). The activity score may reflect accesses to all data in the enterprise database 120, accesses to sensitive data in the enterprise database 120, or accesses to unprotected sensitive data in the enterprise database 120. Beyond reflecting a total count of data accesses, an activity score may indicate a unique number of users accessing to data, making a particular type of access to data, or accessing a particular type of data. Additionally, an activity score may indicate a ratio between types of data access or a proportion of a type of data access out of the total number of data accesses. For example, the activity assessment module 234 determines a ratio between reads and writes to sensitive data in an enterprise database 120.

The cost score module 235 obtains an identifier of an enterprise database 120 and determines a cost score indicating a total value or cost of the data in the enterprise database 120. The cost score module 235 identifies sensitive data types of sensitive data records in the enterprise database 120 and obtains a record cost corresponding to each sensitive data type. For example, the record cost is defined as part of the record classification rule, as shown in FIG. 7B. The cost score module 235 then computes the cost score from Cost=$\Sigma_t R_t N_t$, where the sum is over each sensitive data type t, $R_t$ is the record cost for the sensitive data type, and $N_t$ is the number of data records of the sensitive data type. Accordingly, the cost score is proportional to the record cost and number of data records for the sensitive data type.

Figure 10:
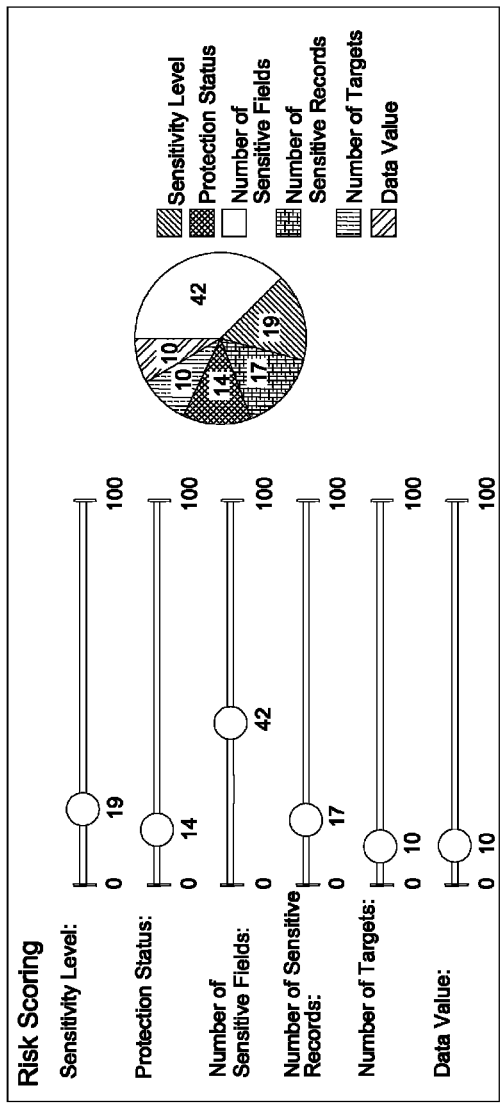
FIG. 10 is an example interface for configuring calculation of risk scores, in accordance with an embodiment.

The risk score module 240 obtains an identifier of an enterprise database 120 and determines a risk score indicating an importance of the enterprise database 120. To determine the risk score, the risk score module 240 combines a number of factors according to user-defined weights, as shown in FIG. 10. The risk score module 240 factors may be combined using a linear combination according to the user-defined weights. As another example, the risk score module 240 determines the percentile of an enterprise database 120 within each factor and linearly combines the percentiles according to the user-defined weights. Example factors used to determine the risk score include a number of sensitive data records in the enterprise database 120, a number of sensitive fields in the sensitive data records of the corresponding enterprise database 120, a number of dependent databases obtaining the sensitive data records from the enterprise database 120, a cost score of the sensitive data records of the enterprise database 120, an average sensitivity level of records in the enterprise database 120 (e.g., public, internal, confidential, privileged, restricted), a number or proportion of unprotected data records among the sensitive data records in the enterprise database 120, a user exposure score of the enterprise database 120, and an activity score of the enterprise database 120.

The filtering module 245 obtains a set of enterprise databases 120 and filters the set into one or more subsets of enterprise databases 120 according to database attributes or database status. Database attributes are characteristics of the database such as database enterprise group, or database location. Database status refers to characteristics of data records stored on an enterprise database 120 such as sensitive data types, protection policies applied, number of protected, unprotected, or total sensitive data records. The protection status module 230, the cost score module 235, or the risk score module 240 may determine an assessment score for a filtered subset of enterprise databases 120. The filtering module 245 may employ one or more binary filters in series. For example, the filtering module 245 outputs a subset of databases having PII data (a sensitive data type) and located in the United States. The filtering module 245 may sort the input set of enterprise databases 120 into multiple subsets. For example, the filtering module 245 outputs subsets of enterprise databases 120 sorted according to presence of a sensitive data type, membership in an enterprise group, or location. An enterprise database 120 may be a member of more than one subset. For example, an enterprise database 120 having PII and PHI is included in two subsets of enterprise databases 120 having PII and PHI data, respectively.

The score estimation module 247 obtains a specification of a type of assessment score and a set of enterprise databases 120 and outputs an estimation of the specified type of assessment score. To estimate an assessment score, the score estimation module 247 directs the classification engine 134 to identify and classify sensitive data using the header type classifier 205. By using header metadata, the header type classifier 205 may quickly determine an estimate of the number and types of sensitive data records in enterprise databases 120. Alternatively or additionally, the classification engine 134 determines estimates of the number and type of sensitive data fields by combining estimates based on field types identified by the header type classifier 205 with estimates based on field types identified by the data sampling classifier 210. For example, classifications of data in unchanged databases are based on sampled or actual counts of sensitive data records, and classifications of sensitive data in changed databases are based on headers.

Having prepared an estimate of number and types of sensitive data records, the score estimation module 247 outputs the estimated assessment score using another module of the assessment module 136 that corresponds to the specified type of assessment score. For example, the score estimation module 247 uses the risk score module 240 to estimate a risk score using the database-level estimates of number and types of sensitive records produced by the classification engine 134. In contrast to producing estimated assessment scores by the score estimation module 247, the assessment module 136 may alternatively use classification of data records on a record-by-record basis. In one embodiment, the assessment module 136 initially produces estimated assessment scores for presentation through the user interface module 137 and then progressively refines the assessment scores by performing record-by-record scans as time permits. Thus, the score estimation module 247 beneficially improves responsiveness to enable quick identification of sensitive data even before a full scan is complete.

User Interface Module

Figure 2C:
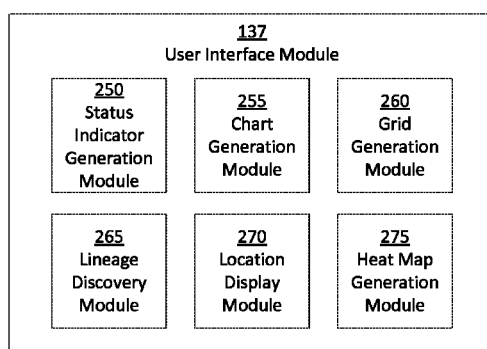
FIG. 2C is a block diagram of an example user interface module, in accordance with an embodiment.

FIG. 2C is a block diagram of user interface module 137, in accordance with an embodiment. The user interface module 137 includes a status indicator generation module 250, a chart generation module 255, a grid generation module 260, a lineage discovery module 265, a location display module 270, and a heat map generation module 275. The functionality of the user interface module 137 may be provided by additional, different, or fewer modules than those described herein.

The status indicator generation module 250 obtains assessment scores and generates corresponding status indicators visually representing the assessment scores. Status indicators are interface elements having a particular color, pattern, size, shape, and position within the user interface. Example status indicators include boxes, bars, slices, trend lines, and arcs. The size (e.g., area, length, arc length), color, pattern, size, shape, or position of a status indicator may reflect an assessment score. For example, the status indicator generation module 250 determines a color for an assessment score from a discrete or continuous mapping (e.g., red for highest risk scores, yellow for medium risk scores, green for low risk scores). Status indicators also may include text (e.g., one or more numbers and letters representing an assessment score (e.g., "1.1 T" represents 1.1 trillion dollars). The text may be color coded according to a discrete or continuous mapping of the assessment score to a set of colors.

A status indicator may represent an assessment score of a single enterprise database 120 or a group of enterprise databases 120. Selection of a status indicator may trigger selection of the corresponding enterprise database 120 (or group thereof). For example, selection of a status indicator prompts the interface to display further details of the corresponding one or more enterprise databases 120. As another example, selection of a status indicator prompts the interface to display a menu of options (e.g., protection policies, scans, alerts) for the one or more enterprise databases 120.

The status indicator generation module 250 may generate an aggregate assessment score for a group of enterprise databases 120. The status indicator generation module 250 identifies a group of enterprise databases 120 having one or more database attributes in common. For the identified group, the status indicator generation module 250 determines an aggregate assessment score from assessment scores of enterprise databases 120 in the group. For example, the aggregate assessment score is a sum total, an average, or a weighted average (e.g., weighted by number of data records, sensitive data records, protected sensitive data records, or unprotected sensitive data records). An aggregate status indicator may reflect the aggregate assessment score through any of its visual display properties (e.g., size, color, etc.).

The chart generation module 255 outputs a chart and takes as input a chart scope, one or more assessment dimensions, and zero or more filtering dimensions. The chart scope is a set of enterprise databases 120 or data used to generate a chart or other interface element. The chart scope may include all enterprise databases 120, a single enterprise database 120, or a subset of enterprise databases 120 (e.g., specified in terms of one or more database attributes or data characteristics). The assessment dimension defines a type of assessment score used to determine at least one aggregate assessment score reflected in at least one aggregate status indicator. A filtering dimension may be a database attribute or a data characteristic used to filter the enterprise databases 120 specified by the scope. Once subsets of databases are obtained using the filtering dimension, the chart generation module 255 obtains aggregate status indicators for each subset of filtered enterprise databases 120 and arranges the obtained aggregate status indicators according to one or more chart templates. If a subset of databases obtained according to the filtering dimension includes only one enterprise database 120, then the status indicator of the enterprise database 120 (for the assessment dimension) is displayed rather than an aggregate status indicator. Selection of an aggregate status element may trigger display of an additional chart (or may update another concurrently displayed chart), where the additional chart has a chart scope including the one or more filtering dimensions corresponding to the selected aggregate status element in addition to the chart scope of the chart containing the selected aggregate status indicator.

For example, from a single assessment dimension, the chart generation module 255 generates a pie chart, an arc graph, or another aggregate status indicator reflecting an aggregate assessment score of databases indicated by the chart scope. As another example, from an assessment dimension and a single filtering dimension, a chart generation module 255 generates a chart such as a bar graph. Such a chart includes an aggregate status indicator determined for each subset of databases filtered according to the filtering dimension (e.g., database attribute or data characteristic). The aggregate status indicator reflects the assessment dimension (e.g., a protection score, cost score, or risk score). As another example, the chart generation module 255 generates a chart from an assessment dimension and two filtering dimensions such as a three-dimensional bar graph. The chart includes an aggregate status indicator determined for each combination of the two filtering dimensions, where each aggregate status indicator reflects an assessment score specified by the assessment dimension. Charts are further described with respect to FIGS. 15A and 15B.

The grid generation module 260 generates a grid of aggregate status indicators from two filtering dimensions, one assessment dimension, and a chart scope. The grid of assessment indicators are arranged according to the two filtering dimensions and are labeled. For example, the filtering dimensions for the grid are enterprise grouping and sensitive data type, so the status indicator generation module 250 generates aggregate assessment indicators for each combination of enterprise grouping and sensitive data type specified by the chart scope. In the example, the aggregate assessment score specified by the assessment dimension is reflected by the aggregate status indicator using color. Selection of an aggregate status indicator may trigger the interface to display further charts (or other interface elements), where the chart scope for the further charts is the combination of filter dimensions corresponding to the selected aggregate status indicator in addition to the chart scope of the grid. Grids are further described with respect to FIG. 12.

The lineage discovery module 265 generates a lineage view of databases from a selection of an enterprise database 120. The lineage discovery module 265 uses the proliferation tracking module 135 to identify enterprise databases 120 that are dependent on the specified enterprise database 120 as well as enterprise databases 120 on which the specified enterprise database 120 depends. The status indicator generation module 250 then generates status indicators corresponding to the identified enterprise databases 120. The proliferation tracking module 135 also indicates a dependency layer of the identified enterprise databases 120 and dependency relationships between them. The lineage discovery module 265 arranges the status indicators according to the dependency relationships and dependency layers of the corresponding enterprise databases 120. For example, the lineage discovery module 265 arranges status indicators in the same dependency layer into a same column and arranges the status indicators within a column to place status indicators in a same row as status indicators of enterprise databases 120 having dependency relationships with the corresponding enterprise database 120.

In some embodiments, the lineage discovery module 265 aggregates enterprise databases 120 having a same set of dependency relationships. For example, enterprise databases 120 depending on a source database and depended on by a same set of dependent databases are aggregated together. Such aggregated enterprise databases 120 are represented by an aggregated status indicator instead of a status indicator. Lineage displays are further described with respect to FIGS. 14A through 14C.

The location display module 270 takes as input one or more locations and an assessment dimension and generates a location display for the one or more locations. Location displays are charts using location as a filtering dimension. A location display may overlay the aggregate status indicators for a location on a map illustrating the corresponding location. One example location display displays aggregate status indicators for a first level of geographic specificity (e.g., continents). In the example, selection of one of the aggregate status indicators prompts the location display module 270 to display additional aggregate status indicators corresponding to a second level of geographic specificity (e.g., country), where the chart scope of the additional aggregate status indicators includes the location of the selected aggregate status indicator. The location display may include status indicators overlaid with a map. For example, a first location display with aggregate status indicators representing continents is overlaid on a world map. Location displays are further described with respect to FIGS. 16A and 16B.

The heat map generation module 275 generates a heat map from one or more filtering dimensions, two assessment dimensions, and a chart scope. Heat maps are charts where one assessment dimension is reflected in a color of the status indicators (e.g., boxes), and the other assessment dimension is reflected in the relative size of the status indicators. The heat map generation module 275 obtains enterprise databases 120 within the chart scope, and the status indicator generation module 250 prepares status indicators for the enterprise databases 120. For example, the size of an enterprise database's status indicators reflects a number of sensitive data records or total number of data records in the enterprise database 120, and the color of the enterprise database 120 reflects a proportion of unprotected sensitive data records, risk score, or a cost score. The status indicators are visually grouped according to the filter dimension. For example, those status indicators that correspond to one value of a filter dimension occupy a contiguous block in the heat map. Heat maps are further described with respect to FIG. 13.

Sensitive Data Identification and Protection

Figure 3:
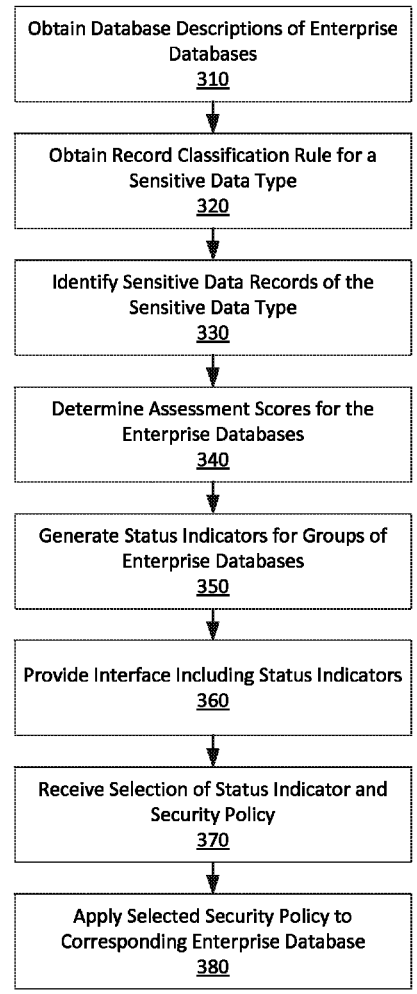
FIG. 3 is a block diagram of an example process for identifying and securing sensitive data, in accordance with an embodiment.

FIG. 3 is a block diagram of an example process for identifying and securing sensitive data, in accordance with an embodiment. The process described herein may be performed in a different order or using different, fewer, or additional steps. For example, steps described as being performed sequentially may be performed in parallel.

The data management service 130 obtains 310 database descriptions of enterprise databases 120, where a database description indicates a database attribute of an enterprise database 120. The data management service 130 obtains 320 a record classification rule for a sensitive data type, where the record classification rule specifies at least one field type. The classification engine 134 identifies 330 sensitive data records of the sensitive data type by identifying data records having the at least one field type specified by the record classification rule. The assessment module 136 determines 340 assessment scores for the enterprise databases 120. An assessment score may be determined from a number of identified sensitive data records in the corresponding database.

The user interface module 137 generates 350 status indicators for groups of enterprise databases 120 each having a common database attribute. A status indicator for an enterprise group reflects a total number of identified sensitive data records in enterprise databases 120 having membership in the enterprise group. The user interface module provides 360 an interface comprising the generated status indicators.

The data management service 130 receives 370 via the user interface a selection of one of the generated status indicators and a selection of a protection policy. The security engine 138 applies 380 the selected protection policy to sensitive data records of an enterprise database 120 having membership in the enterprise group corresponding to the selected status indicator.

Example Interface

FIG. 4A is an example interface illustrating database attributes of an enterprise database 120, in accordance with an embodiment. The properties include a name and description of the database (as used within the data management service 130) as well as database configuration properties such as database type, connectivity (e.g., IP (internet protocol) address, port number, service name, domain name), and access credentials (e.g., connection string, username, password). The database attributes include an associated location and enterprise groupings (e.g., application group, security group, department).

Figure 4C:

FIGS. 4B and 4C are example interfaces for obtaining attributes of an enterprise database 120, in accordance with an embodiment. Some or all of the properties listed in FIG. 4C may be relevant to specific repository and/or data store types selected in FIG. 4B. Accordingly, the selection of a repository and/or data store type in FIG. 4B prompts the UI generator 137 to display additional database attributes specific to the data store and/or repository type.

Figure 5A:
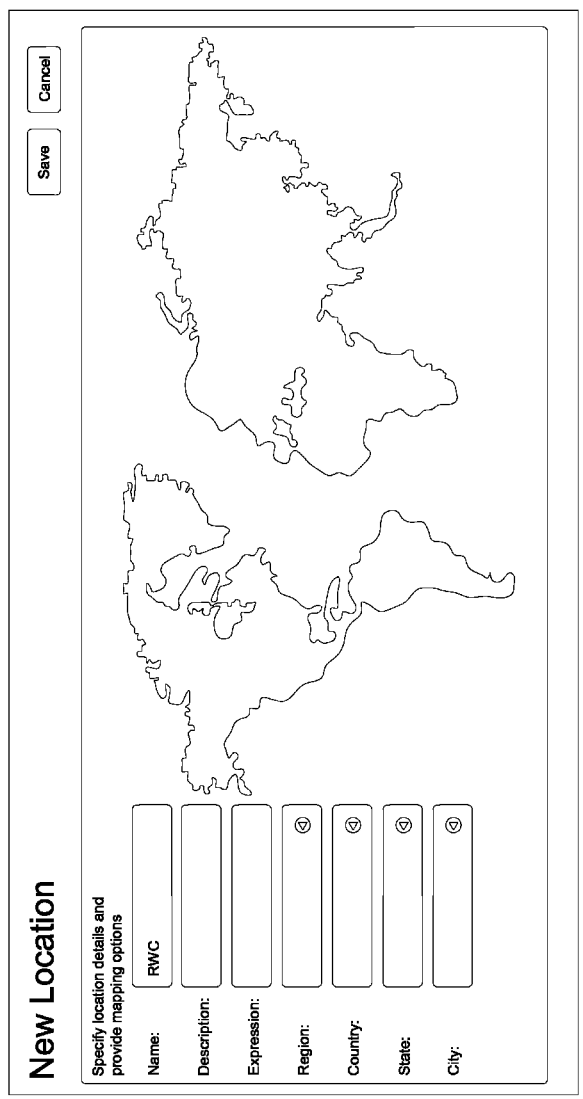
FIG. 5A is an example interface for obtaining attributes of a location, in accordance with an embodiment.

FIG. 5A is an example interface for obtaining location attributes of a location, in accordance with an embodiment. The location attributes include a name and description for use within the data management service 130 as well as specification of geographic locations (e.g., region, country, state, city) of varying specificity. The location attributes also include an expression field for entering a pattern in IP or other network address, which the data management service 130 may use to determine a location of the enterprise database 120.

Figure 5B:
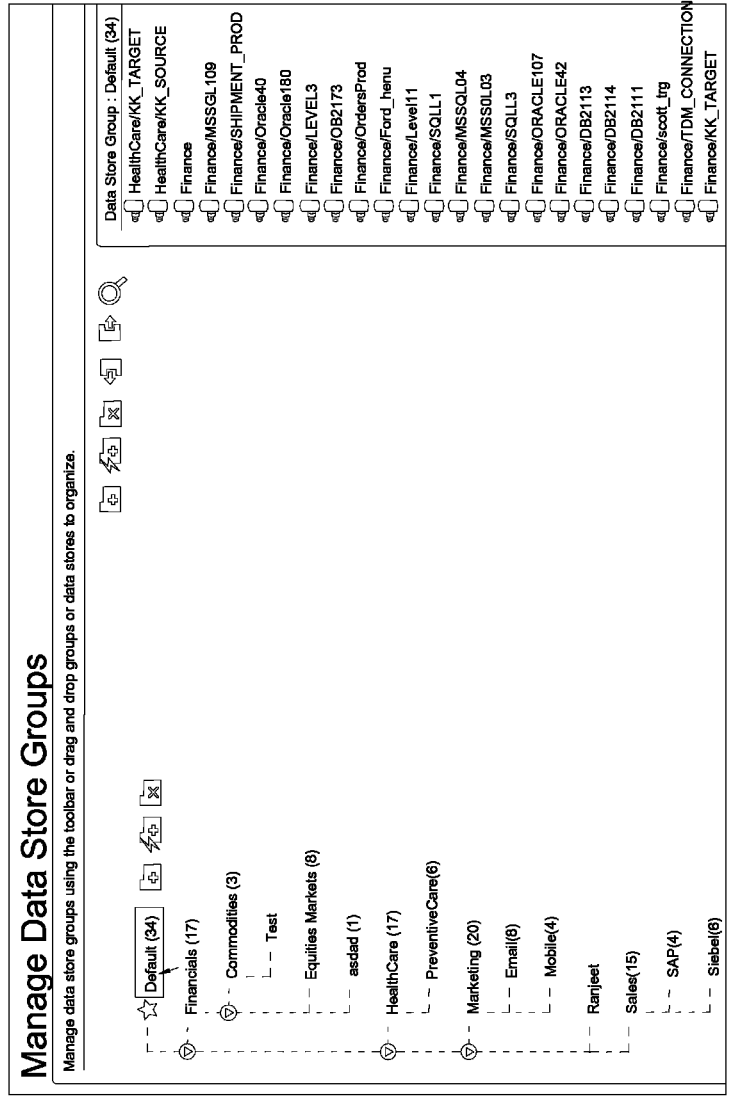
FIG. 5B is an example interface for associating an enterprise database with an enterprise group, according to an embodiment.

FIG. 5B is an example interface for associating an enterprise database 120 with an enterprise group, according to an embodiment. Using the tree menu on the left, a user may add, modify, and delete enterprise groups. The user may also specify sub-group relationships of enterprise groups. For example, the enterprise groups "commodities" and "equities markets" are part of the "financials" enterprise group. By dragging and dropping the enterprise databases 120 listed on the right to an enterprise group, the user may associate the enterprise database 120 with the selected enterprise group (and any enterprise groups including the selected enterprise group).

Figure 6A:
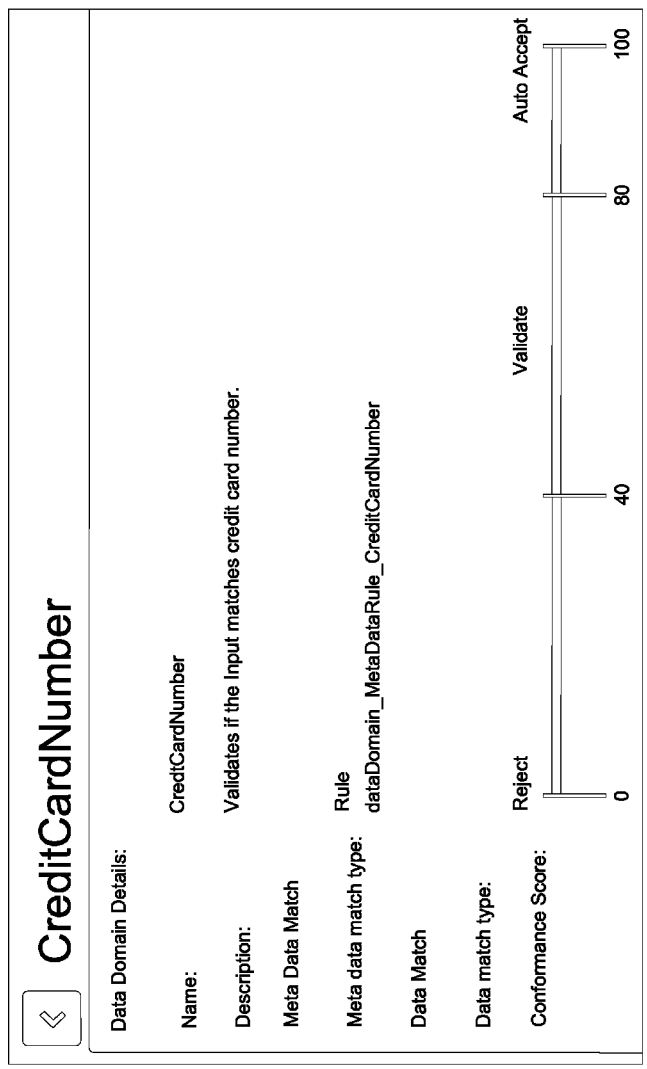
FIG. 6A is an example interface illustrating properties of a field classification rule, in accordance with an embodiment.
Figure 6B:
FIGS. 6B and 6C are example interfaces for configuring a field classification rule, in accordance with an embodiment.
Figure 6C:

FIG. 6A is an example interface illustrating properties of a field classification rule, in accordance with an embodiment. The field classification rule includes a name and description for use within the data management service 130 as well as conditions for the field classification rule. In this case, the field is classified as having a credit card number type if the metadata of the header matches metadata specified by a selected rule. FIGS. 6B and 6C are example interfaces for configuring a field classification rule, in accordance with an embodiment. In FIG. 6B, the user may select a metadata match condition using the header metadata (e.g., using the header type classifier 205). The metadata may be compared against a user entered pattern (in the text box) or a standard reference table or rule (e.g., created by the data management service 130 to streamline the user's workflow). In FIG. 6C, the user may select a data match condition using sampled fields (e.g., using the data sampling classifier 210). When using sampled fields, the user may select rejection and validation thresholds. The user may also select data sampling options such as number of sampled fields and sampling method (e.g., first, last, uniform, random). The user also selects a pattern, reference table, or standard rule for comparison against the sampled fields.

Figure 7A:
FIG. 7A is an example interface illustrating example record classification rules, in accordance with an embodiment.
Figure 7B:

FIG. 7A is an example interface illustrating example record classification rules, in accordance with an embodiment. The interface summarizes a number of field types ("Domains") specified by each record classification rule, a number of enterprise databases 120 having the sensitive data type of each record classification rule, and a number of scans identifying sensitive data using each record classification rule.

FIGS. 7B and 7C are example interfaces for configuring a record classification rule, in accordance with an embodiment. In FIG. 7B, the user indicates a name, description, record cost, and sensitivity level associated with the classification rule. The user also selects one or more field types used by the classification rule. In FIG. 7C, the user indicates the Boolean logic for combining the field types such as match any (OR), match all (AND), or match a custom combination. To specify the custom combination of Boolean logic, the user selects field types and specifies Boolean operators for determining whether data records have the sensitive data type.

Figure 7D:
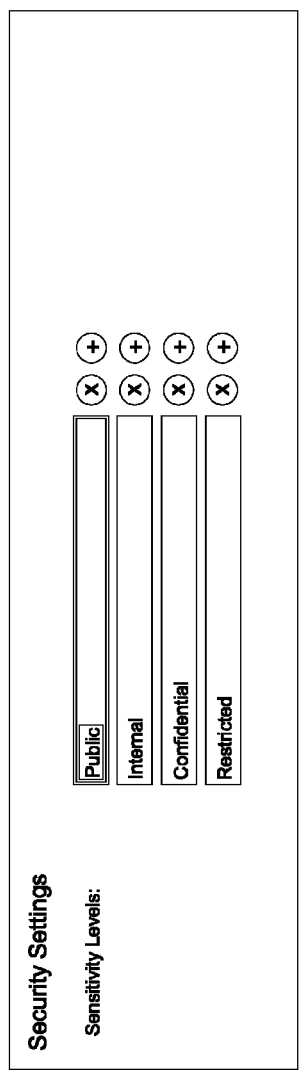
FIG. 7D is an example interface for configuring sensitivity levels, in accordance with an embodiment.

FIG. 7D is an example interface for configuring sensitivity levels, in accordance with an embodiment. The user may specify different names for the sensitivity levels as well as modify the number of sensitivity levels used. The least sensitive level is listed at top ("Public") and the most sensitive level is listed at bottom ("Restricted).

FIG. 8A is an example interface illustrating example data scans, in accordance with an embodiment. The interface summarizes a number of field types ("Domains") queried in each scan, a number of enterprise databases 120 queried in each scan, and a number of record classification rules checked in each scan as well as a scan status. A failed scan may have failed due to access problems in a specified enterprise database 120, for example.

FIGS. 8B through 8D are example interfaces for configuring a data scan, in accordance with an embodiment. In FIG. 8B, the user enters a name, description, and repository type for the scan, and the user selects enterprise databases 120 to scan. In FIG. 8C, the user selects the record classification rules checked in the scan. In FIG. 8D, the user schedules the scan (e.g., run upon creation, run at a scheduled time, run at a recurring time).

FIG. 9A is an example interface illustrating example alert rules, in accordance with an embodiment. The interface lists the number of alert rule conditions, a severity of the alert rule, an action to take, and a frequency with which the access monitoring module 139 scans enterprise databases 120 with the alert rule.

Figure 9C:
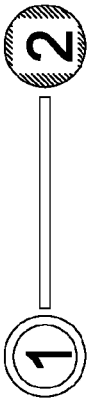

FIGS. 9B and 9C are example interfaces for configuring an alert rule, in accordance with an embodiment. In FIG. 9B, the user enters a name, description, and severity band for the alert rule. The severity band may be used to prioritize (e.g., sort) alerts generated by alert rules for review by an administrator. The user also specifies one or more alert conditions. An alert condition includes a database attribute or data characteristic and an operator for determining whether the alert condition evaluates to true. If the user specifies multiple alert conditions, then the alert rule generates an alert for enterprise databases 120 meeting the multiple alert conditions. In FIG. 9C, the user schedules checking of the alert rule (e.g., run upon creation, run at a scheduled time, run at a recurring time). The user also selects one or more consequences of the rule (e.g., email notification, push notification on a native application on a mobile device).

FIG. 9D is an example interface illustrating an alert generated by an alert rule, in accordance with an embodiment. The alert lists enterprise database 120 meeting the alert conditions as well as characteristics of the alert (e.g., severity, scan name). For each identified enterprise database 120, the interface lists a risk score (e.g., determined by the risk score module 240), a protection status (e.g., determined by the protection status module 230), a sensitivity of data on the enterprise database 120 (e.g., determined from the sensitive data type), a data cost score (e.g., determined by the cost score module 235), and a user in charge.

FIG. 10 is an example interface for configuring calculation of risk scores, in accordance with an embodiment. Using the sliders, a user may indicate numerical weighting for the different risk factors including sensitivity level, protection status (e.g., determined by the protection status module 230), number of fields including sensitive data (e.g., indicated by a data classification rule and determined by the classification engine 134), number of sensitive data records (e.g., determined by the classification engine 134), number of dependent databases ("targets") (e.g., determined by the proliferation tracking module 136), and cost score (e.g., determined by the cost score module 235). The pie chart at right indicates relative weighting of the risk factors (e.g., in terms of the raw weighting values or in terms of percentages of the total weighting values).

Figure 11A:
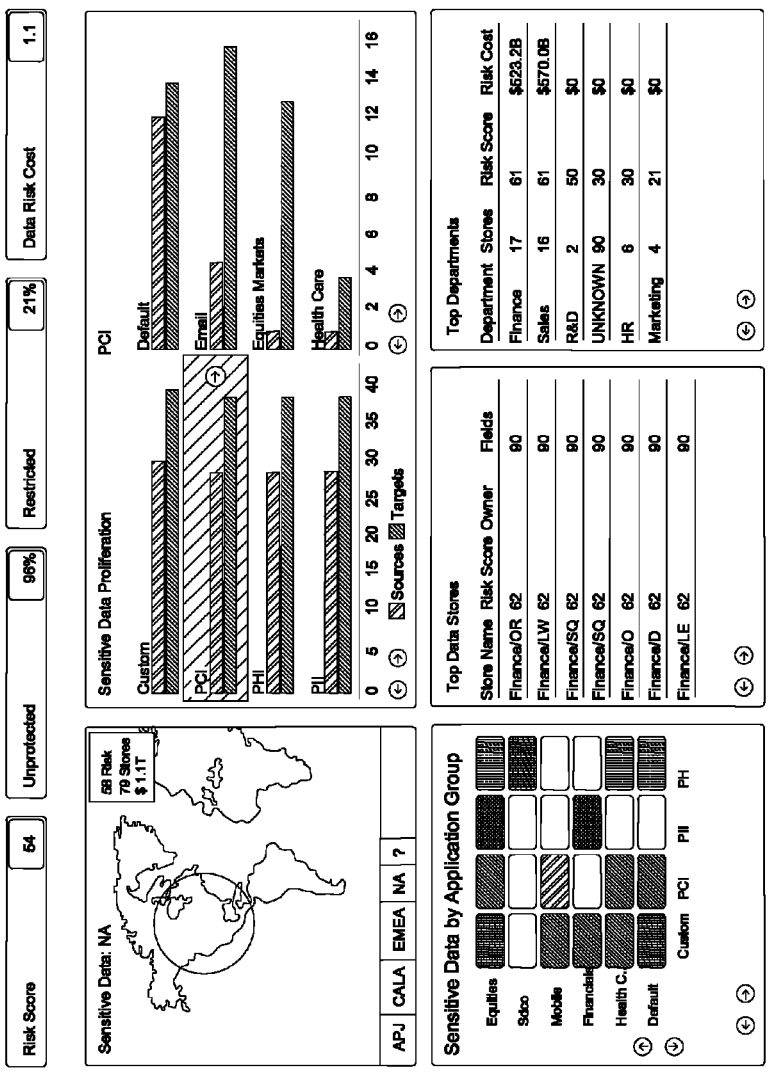
FIG. 11A is an example interface illustrating a status overview of enterprise databases, in accordance with an embodiment.

FIG. 11A is an example interface illustrating a status overview of enterprise databases 120, in accordance with an embodiment. The status overview includes a location display (e.g., generated by the location display module 270), a grid (e.g., from the grid generation module 260), and charts (e.g., from the chart generation module 255). The location display includes aggregate status indicators (e.g., cost score, risk score, total databases) for enterprise database 120 in a particular location (e.g., North America), but other locations may be specified using the buttons below the map. The grid is a chart where each aggregate status indicator corresponds to data filtered by sensitive data type and enterprise group (filtering dimensions), and where color of the aggregate status indicators corresponds to risk score or proportion of sensitive data records (the assessment dimension). Using the arrows, the user may scroll to view aggregate status indicators for other enterprise groups or sensitive data types that don't fit within the displayed gird. The bar charts indicate relative number of source databases and dependent databases having different sensitive data types (a first filtering dimension at left), or belonging to different enterprise groups (a second filtering dimension at right). As illustrated, the user has selected the aggregate status indicator for PCI. In response, the scope of the charts on the right has changed to include only enterprise databases 120 having sensitive data of the PCI type. Using the arrows, the user may view aggregate status indicators for other values of the filtering dimensions of the bar charts. The bottom middle display indicates enterprise databases 120 having a highest risk score. The bottom right displays numerical aggregate status indicators for the filtering dimension of enterprise group and the assessment dimensions of total databases, risk score, and cost score. The aggregate status indicators are ranked by the aggregate assessment scores (risk score, cost score, or both).

Figure 11B:
FIG. 11B is a close-in view of expandable elements of the status overview illustrated in FIG. 11A, in accordance with an embodiment.

FIG. 11B is a close-in view of expandable elements of the status overview illustrated in FIG. 11A, in accordance with an embodiment. The illustrated elements may be viewed by selecting the aggregate status indicators determined for all enterprise databases 120 at the top of the interface of FIG. 11A. The aggregate status indicators include bar graphs, numerical statistics, and temporal trends in aggregate assessment scores (risk score, proportion of unprotected sensitive data, and cost score). The arrows and numbers at the bottom right of each box indicate a percentage change from a recent time period (e.g., the last month).

Figure 11C:
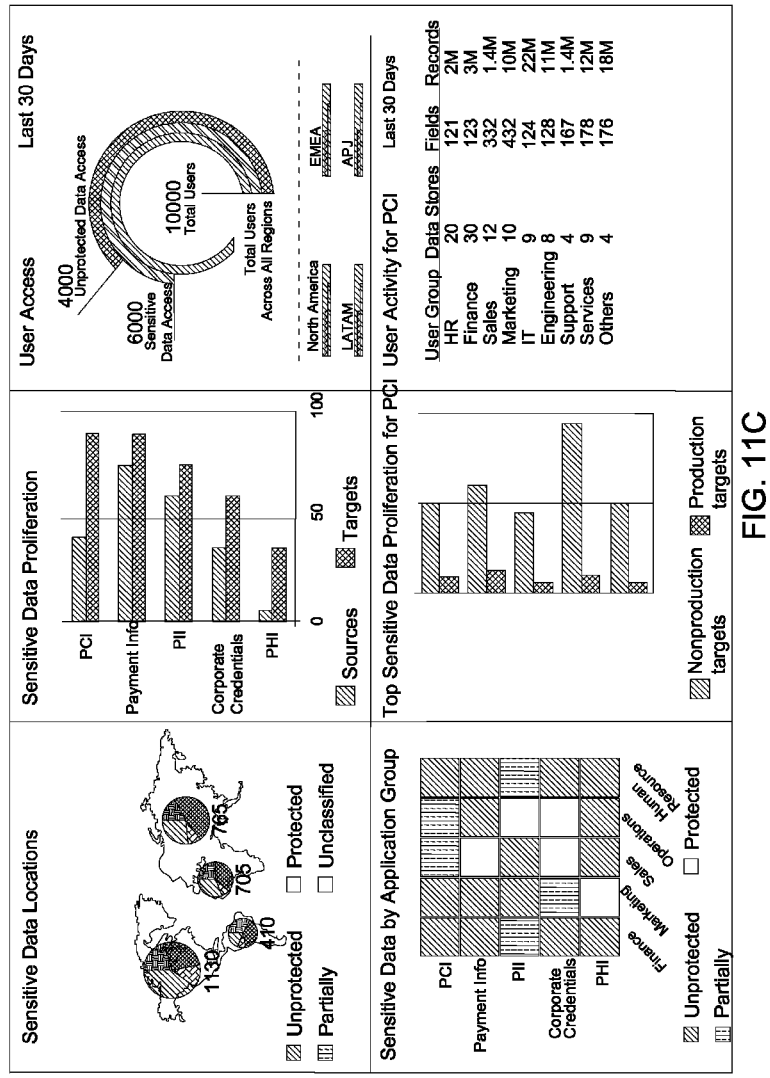
FIG. 11C is another example interface illustrating a status overview of enterprise databases, in accordance with an embodiment.

FIG. 11C is another example interface illustrating a status overview of enterprise databases 120, in accordance with an embodiment. The other example interface includes similar elements to the interface illustrated in FIG. 11A. Instead of risk scores, the assessment score is a categorization of an enterprise database's sensitive data records as protected, partially protected, protected, or unclassified (e.g., due to failure to scan for sensitive data). Another assessment dimension used in the upper-right chart is an aggregated total number of users having access to data, as determined for the filtering dimension of access to any data, sensitive data, and unprotected sensitive data. Alternatively or additionally, the upper-right chard indicates a total number of access operation to unprotected data, a total number of access operations to sensitive data, and a total number of access operations overall. Similarly, the lower-right table indicates a number of enterprise databases 120, a total number of sensitive data fields, and a total number of sensitive data records accesses by users in various enterprise groups, in this case departments.

Figure 12:
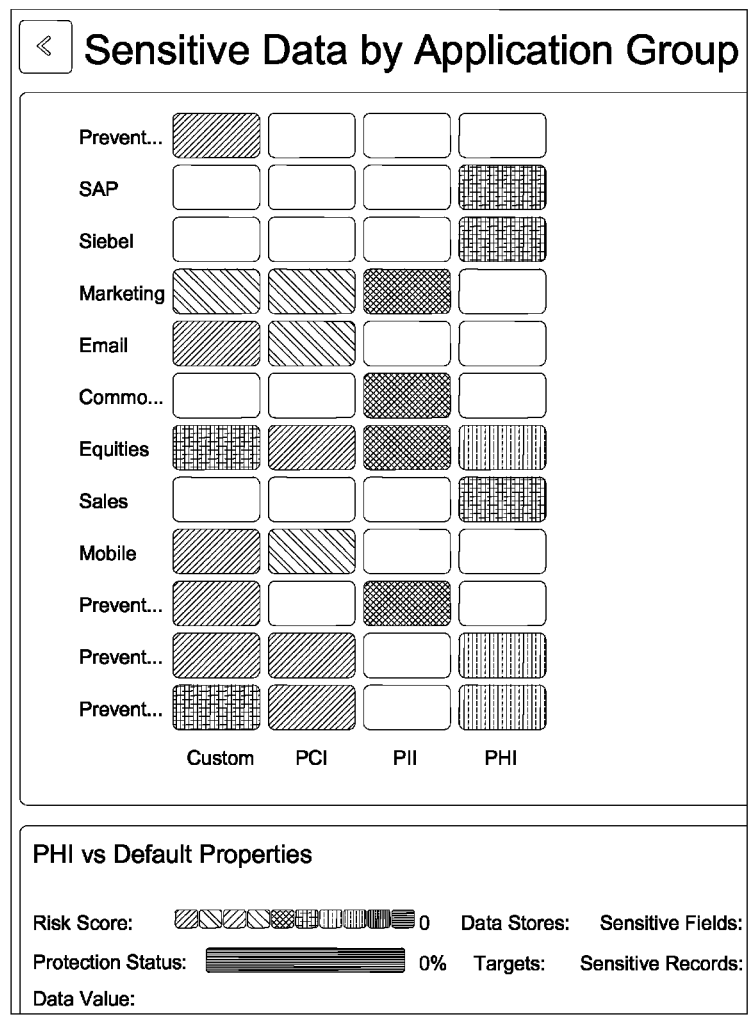
FIG. 12 is an example interface including a grid view of status indicators, in accordance with an embodiment.

FIG. 12 is an example interface including a grid view of status indicators, in accordance with an embodiment. The grid is a chart where each aggregate status indicator corresponds to data filtered by sensitive data type and enterprise group (filtering dimensions), and where color of the aggregate status indicators corresponds to risk score or the proportion or number of sensitive data records (the assessment dimension). By selecting an aggregate status indicator (e.g., for the enterprise group "Default" and the sensitive data type PHI), the user may view additional aggregate status indicators (risk score, protection status, cost score, other risk factors) generated using a chart scope of the selected enterprise group and sensitive data type.

Figure 13:
FIG. 13 is an example interface including a heat map of status indicators, in accordance with an embodiment.

FIG. 13 is an example interface including a heat map of status indicators, in accordance with an embodiment. The filter dimension for the heat map is enterprise grouping (e.g., department). The heat map includes status indicators corresponding to databases in the enterprise grouping. The status indicators for databases having a common department are grouped under blocks. The assessment dimensions are the number of sensitive data records (reflected in the size of the respective status indicators) and the risk score (reflected in the color of the respective status indicators).

Figure 14A:
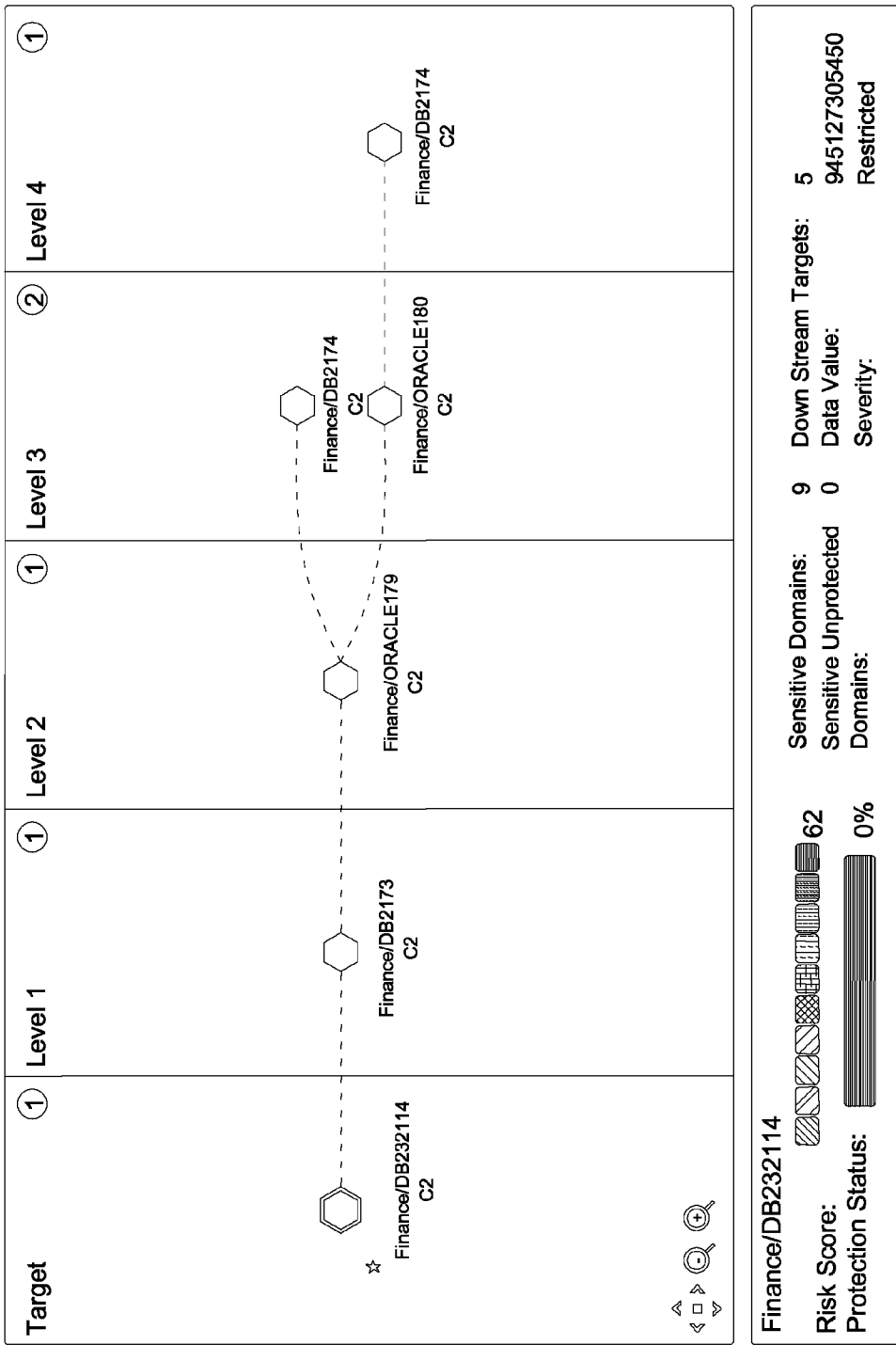
FIG. 14A is an example interface including a lineage view of enterprise databases, in accordance with an embodiment.

FIG. 14A is an example interface including a lineage view of enterprise databases 120, in accordance with an embodiment. The status indicator of the source database is indicated at the far left, and various layers of dependent databases are illustrated with status indicators from left to right in order of increasing layers of dependence. The lines between the status indicators indicate dependency relationships between the corresponding enterprise databases 120. The status indicators have colors indicating protection status. Selection of a status indicator corresponding to an enterprise database 120 prompts the interface to update the status indicators at bottom (i.e., by changing the chart scope to the selected enterprise database 120. The status indicators at the bottom have assessment dimensions including risk score, protection status, and other risk factors.

Figure 14B:
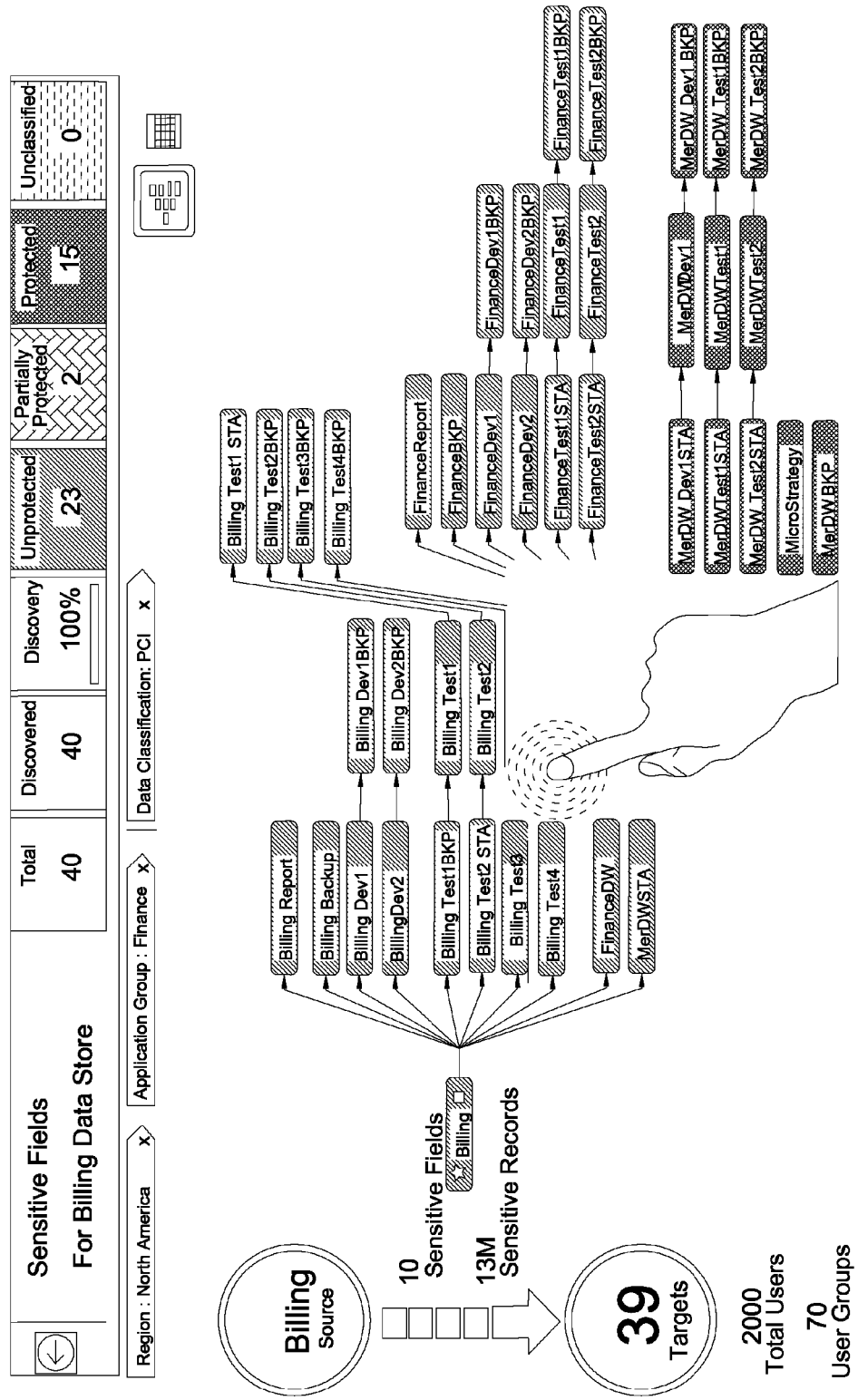
FIG. 14B is another example interface including a lineage view of enterprise databases, in accordance with an embodiment.

FIG. 14B is another example interface including a lineage view of enterprise databases 120, in accordance with an embodiment. The left side includes aggregate status indicators (e.g., number of sensitive fields, number of sensitive data records, number of dependent databases, users able to access the sensitive data records, number of user groups able to access the sensitive data records) for the enterprise databases 120 corresponding to the displayed status indicators.

Figure 14C:
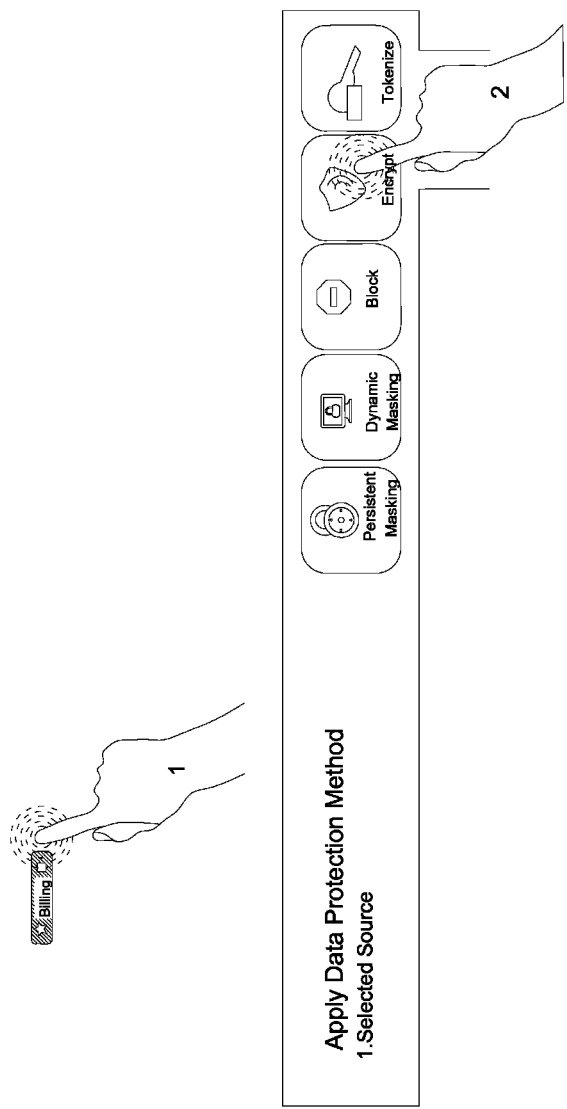
FIG. 14C is an example interface for applying a protection policy to a source database selected from the lineage view illustrated in FIG. 14B, in accordance with an embodiment.
Figure 14D:
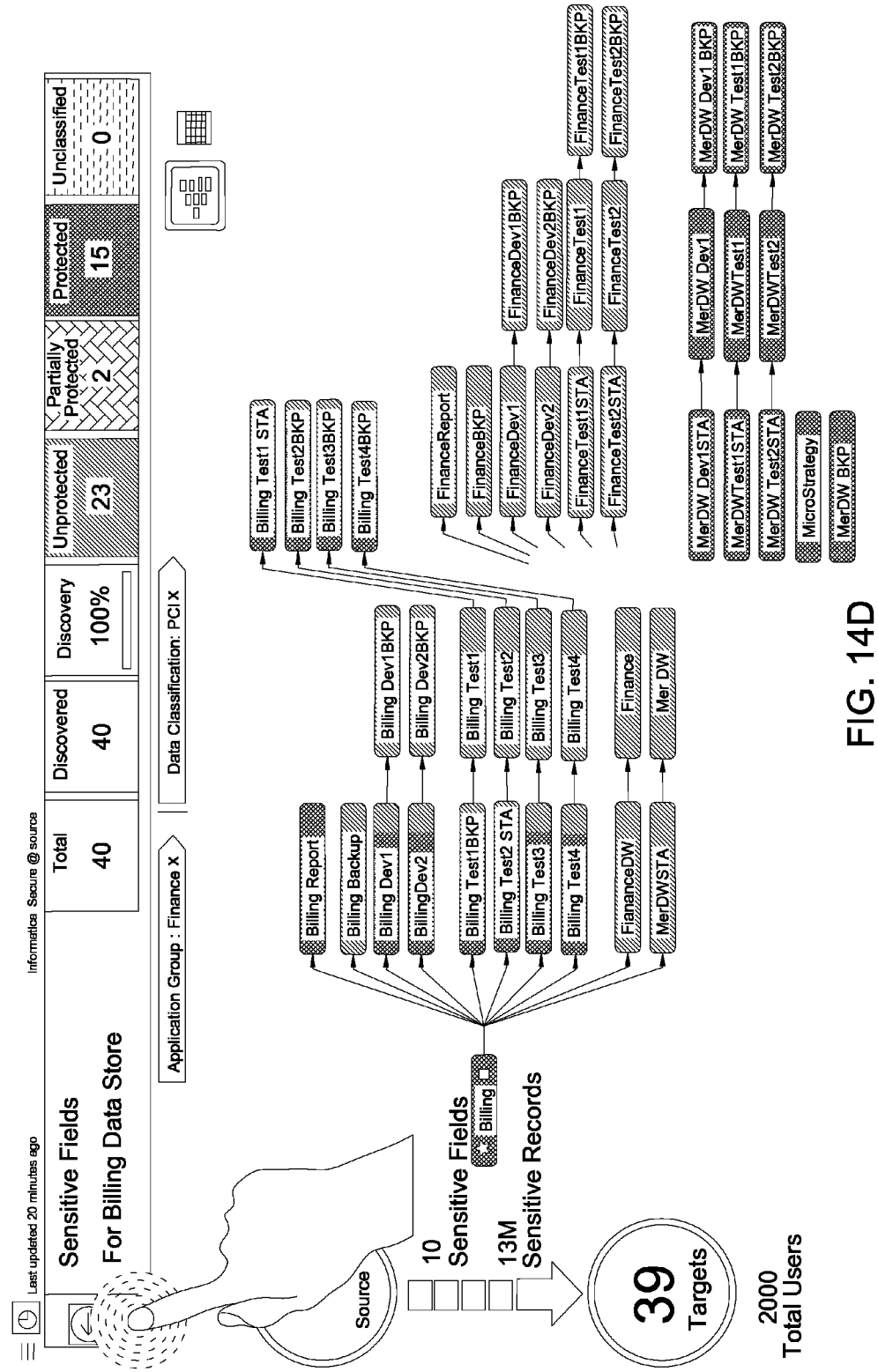
FIG. 14D is an example interface illustrating a change in status indicators included in the lineage view illustrated in FIG. 14B as a result of applying a protection policy, in accordance with an embodiment.

FIG. 14C is an example interface for applying a protection policy to a source database selected from the lineage view illustrated in FIG. 14B, in accordance with an embodiment. In response to the user selecting the source database (step 1), the interface displays a menu of protection policies. The user selects a protection policy from the menu (step 2). FIG. 14D is an example interface illustrating a change in status indicators included in the lineage view illustrated in FIG. 14B as a result of applying a protection policy, in accordance with an embodiment. Due to the dynamic masking applied at the source database, the protection status of the source database has changed to protected. Meanwhile, the databases dependent on the source database have become partially protected as the protected data proliferates through the dependent databases.

Figure 15A:
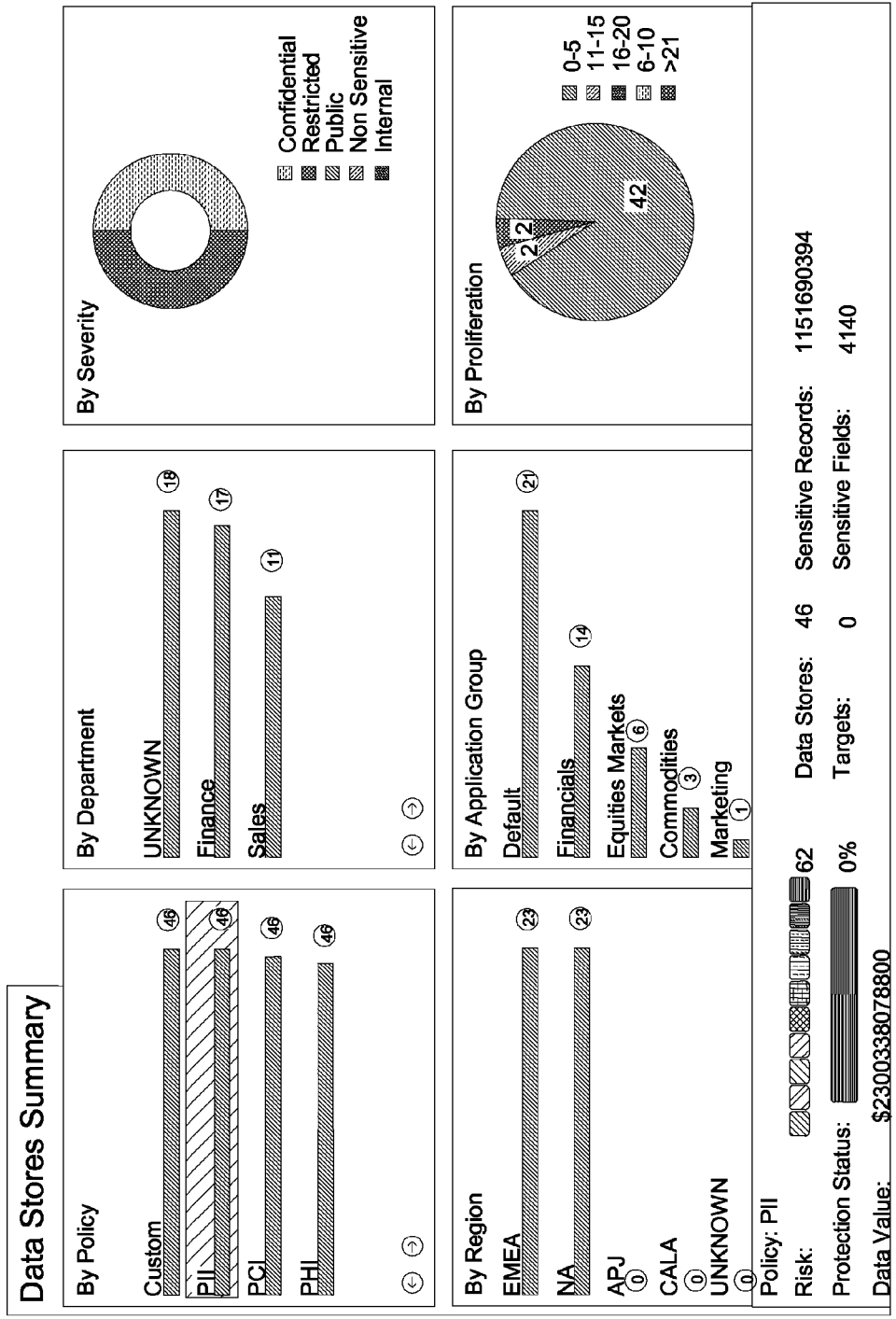
FIG. 15A is an example interface illustrating filterable status indicators of enterprise databases, in accordance with an embodiment.

FIG. 15A is an example interface illustrating filterable status indicators of enterprise databases 120, in accordance with an embodiment. The interface includes several charts with different filtering dimensions including sensitive data type, enterprise grouping, location region, and application group. The four leftmost charts have an assessment dimension of risk score. The charts at right do not have a filtering dimension but instead indicate aggregate assessment scores for an assessment dimension such as sensitivity level and number of dependent databases. Selecting one of the aggregate status indicators of the chart (in this case PII) causes the chart scope of the other five charts to include only enterprise databases 120 that store PII-type sensitive data. Additionally, selecting one of the aggregate status indicators of the chart (in this case PII) causes the chart scope of the other charts to include the database attribute or data characteristic corresponding to the selected aggregate status indicator. Accordingly, the aggregate status indicators are regenerated according to the new chart scope (in this case PII).

Figure 15B:
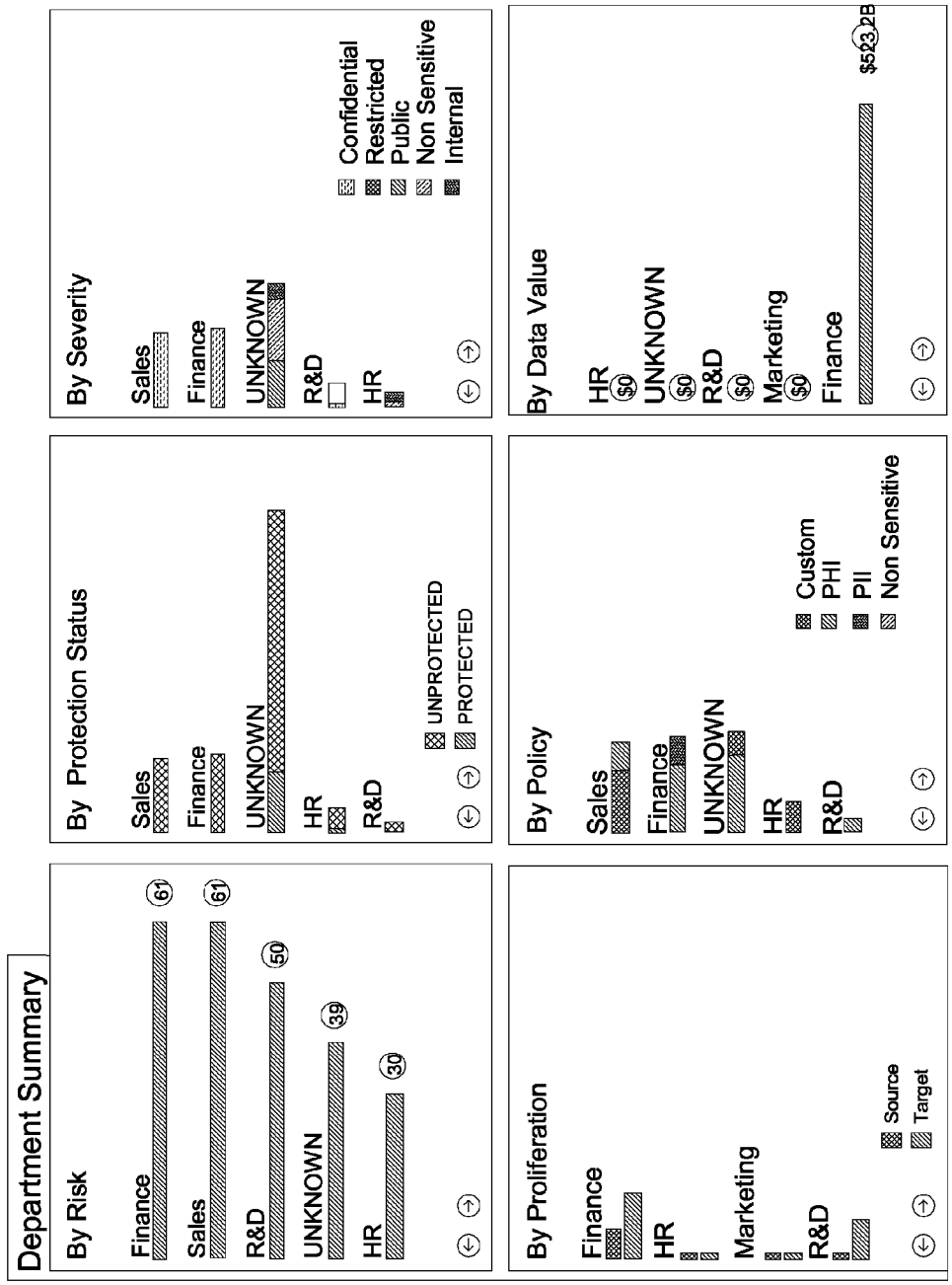
FIG. 15B is an example interface illustrating filterable status indicators of databases in enterprise groups, in accordance with an embodiment.

FIG. 15B is an example interface illustrating filterable status indicators of databases in enterprise groups, in accordance with an embodiment. FIG. 15B illustrates six bar charts each having an enterprise group filter dimension. The assessment dimension for the six charts correspond to risk score, protection status, sensitivity level, number of source databases and dependent databases, number of databases having different sensitive data types, and cost score. The assessment dimension is reflected in the width of the colored bar corresponding to a value of the filter dimension for the bar chart.

Figure 16A:
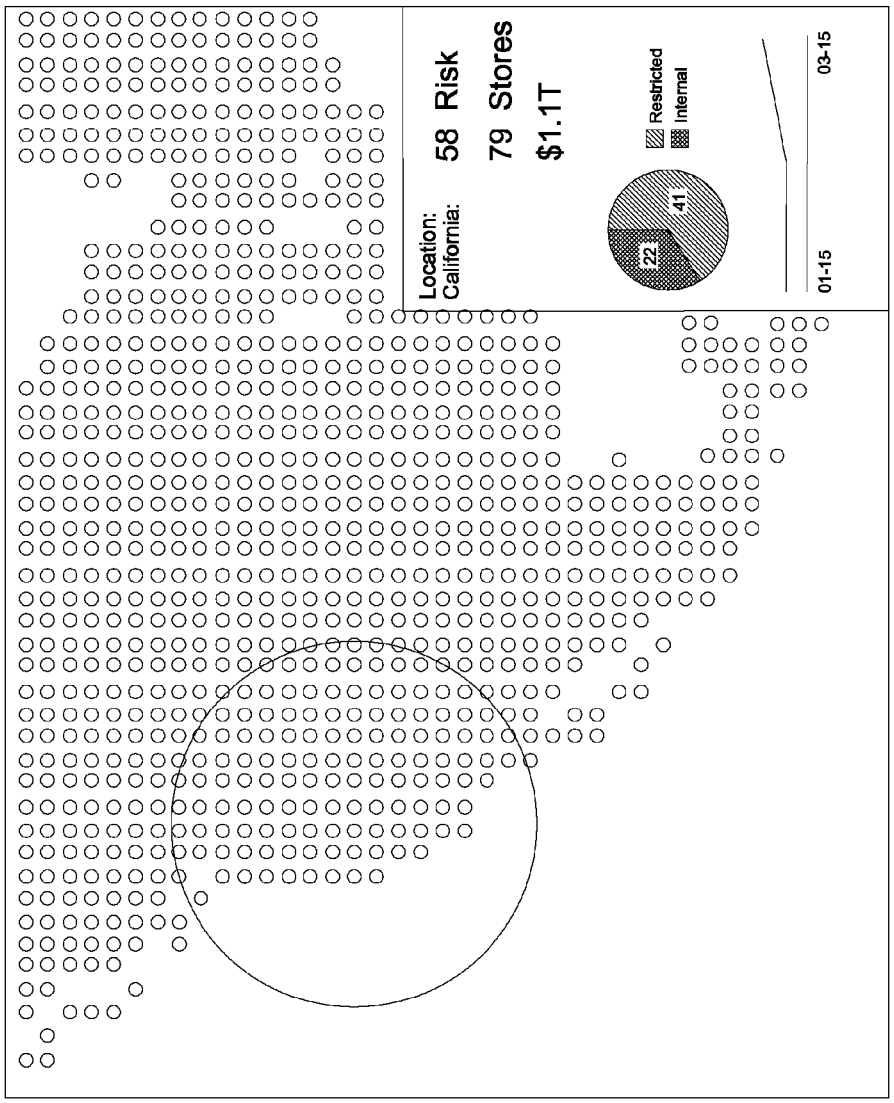
FIG. 16A is an example interface including status indicators of databases in a geographic region, in accordance with an embodiment.

FIG. 16A is an example interface including status indicators of databases in a geographic region, in accordance with an embodiment. The location display has a chart scope of databases with a particular location (California) and includes aggregate assessment indicators including risk score, number of enterprise databases 120, cost score, and sensitivity levels. The location display also includes a temporal trend display for an assessment dimension such as risk score.

Figure 16B:
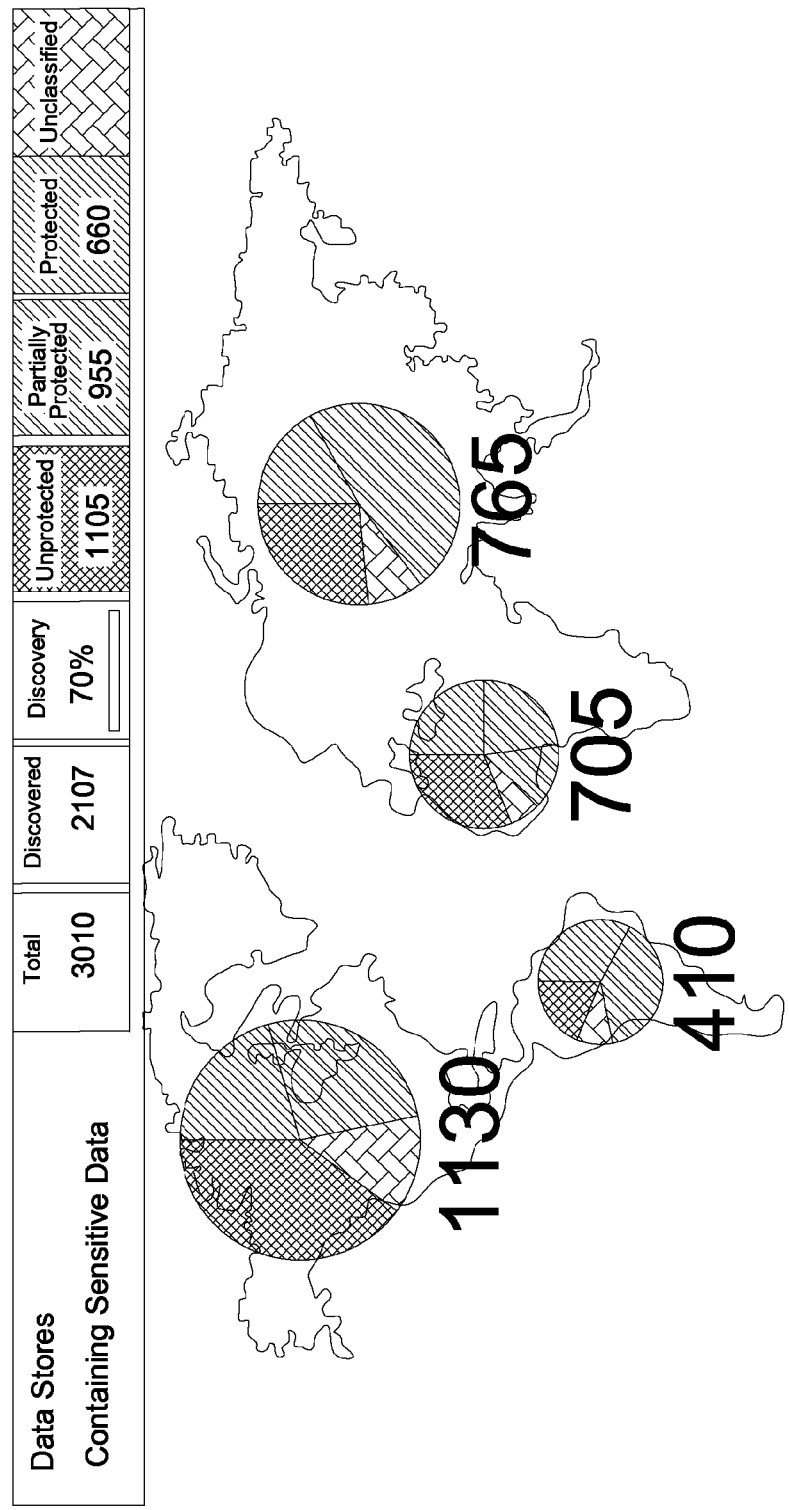
FIG. 16B is another example interface including status indicators of databases in different geographic regions, in accordance with an embodiment.

FIG. 16B is another example interface including status indicators of databases in different geographic regions, in accordance with an embodiment. Each continent has a chart with a chart scope of enterprise databases 120 in the continent, a filter dimension of protection status, and an assessment dimension of total number of databases.

Additional Considerations

Some portions of above description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. To implement these operations, the data management service 130 may use a non-transitory computer-readable medium that stores the operations as instructions executable by one or more processors. Any of the operations, processes, or steps described herein may be performed using one or more processors. Furthermore, it has also proven convenient at times, to refer to these arrangements of operations as modules, without loss of generality. The described operations and their associated modules may be embodied in software, firmware, hardware, or any combinations thereof.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the embodiments. This description should be read to include one or at least one and the singular also includes the plural unless it is obvious that it is meant otherwise.

Additional alternative structural and functional designs may be implemented for securing and monitoring sensitive data. Thus, while particular embodiments and applications have been illustrated and described, it is to be understood that the disclosed embodiments are not limited to the precise construction and components disclosed herein. Various modifications, changes and variations may be made in the arrangement, operation and details of the method and apparatus disclosed herein without departing from the spirit and scope defined in the appended claims.

The invention claimed is:

1. A method executed by one or more computing devices for discovering and protecting sensitive data within an enterprise, the method comprising:
   receiving, by at least one of the one or more computing devices, a record classification rule configured to identify sensitive records having a sensitive data type stored on a plurality of enterprise databases, wherein the record classification rule specifies one or more field types;
   identifying, by at least one of the one or more computing devices, sensitive data records having the sensitive data type based at least in part on header data corresponding to a plurality of data records stored on the plurality of enterprise databases and the one or more field types specified by the record classification rule;
   transmitting, by at least one of the one or more computing devices, a plurality of status indicators corresponding to a plurality of groups of enterprise databases, wherein each group of enterprise databases shares at least one common attribute and wherein each status indicator is based at least in part on identified sensitive data records in each group of enterprise databases;
   receiving, by at least one of the one or more computing devices, selection of a status indicator in the plurality of status indicators, the status indicator corresponding to a group of enterprise databases in the plurality of groups of enterprise databases;
   receiving, by at least one of the one or more computing devices, a selection of a protection policy, the protection policy configured to apply a data transformation to data associated with any data records that are linked to the protection policy; and
   applying, by at least one of the one or more computing devices, the selected protection policy to the identified sensitive data records in the group of enterprise databases corresponding to the selected status indicator to link the identified sensitive data records in the group of enterprise databases with the selected protection policy.

2. The method of claim 1, wherein applying the data transformation to identified sensitive data records in the group of enterprise databases comprises:

identifying a source database in the group of enterprise databases which provides the identified sensitive data records to other enterprise databases in the group of enterprise databases; and applying the selected protection policy to the identified sensitive data records on the identified source database to link the identified sensitive data records in the identified source database with the selected protection policy.

3. The method of claim 1, wherein each status indicator is based at least in part on at least one assessment score corresponding to at least one enterprise databases in each group of enterprise databases and wherein each assessment score is determined based on one or more of:

a number of identified sensitive data records in a corresponding enterprise database, a number of sensitive fields in the identified sensitive data records of the corresponding enterprise database, a number of dependent enterprise databases obtaining the identified sensitive data records from the corresponding enterprise database, a value of the identified sensitive data records of the corresponding enterprise database, whether a transformation corresponding to a protection policy has been applied to the identified sensitive data records of the corresponding enterprise database, or a record cost value corresponding to the sensitive data type of the identified sensitive data records.

4. The method of claim 1, wherein an area of each status indicator corresponds to a a number of identified sensitive data records in the corresponding group of enterprise databases and wherein a color of each status indicator corresponds to an assessment score of the corresponding group of enterprise databases.

5. The method of claim 1, wherein identifying one or more sensitive data records having the sensitive data type based at least in part on header data corresponding to a plurality of data records stored on the plurality of enterprise and the one or more field types specified by the record classification rule comprises:

identifying one or more field classification rules specifying one or more character patterns corresponding to the one or more field types specified by the record classification rule;

retrieving header data corresponding to one or more data records sampled from an enterprise database;

applying pattern recognition rules to the header data using the character patterns of the one or more field classification rules to identify one or more fields in the one or more data records; and identifying the one or more data records as having the sensitive type based at least in part on a comparison of the identified one or more fields and the one or more field types specified by the record classification rule.

6. The method of claim 5, wherein the one or more records comprise a plurality of data records, wherein the pattern recognition rules are applied to the header data using the character patterns of the one or more field classification rules to identify one or more fields in the plurality of data records, and wherein identifying the one or more data records as having the sensitive type based at least in part on a comparison of the identified one or more fields and the one or more field types specified by the record classification rule comprises:

determining a quantity of data records in the plurality of records having identified fields matching the one or more field types specified by the record classification rule; and identifying the plurality of data records as having the sensitive type based at least in part on a determination that the quantity of data records exceeds a verification threshold.

7. The method of claim 1, wherein the data transformation comprises one or more of:

a persistent masking transformation configured to mask stored data in the identified sensitive data records;

a dynamic masking transformation configured to selectively mask data requested from the identified sensitive data records;

a blocking transformation configured to transform permissions associated with the identified sensitive data records;

an encryption transformation configured to encrypt data associated with the identified sensitive data records; or a tokenization transformation configured to tokenize data associated with the identified sensitive data records.

8. An apparatus for discovering and protecting sensitive data within an enterprise, the apparatus comprising:

one or more processors; and one or more memories operatively coupled to at least one of the one or more processors and having instructions stored thereon that, when executed by at least one of the one or more processors, cause at least one of the one or more processors to:

receive a record classification rule configured to identify sensitive records having a sensitive data type stored on a plurality of enterprise databases, wherein the record classification rule specifies one or more field types;

identify sensitive data records having the sensitive data type based at least in part on header data corresponding to a plurality of data records stored on the plurality of enterprise databases and the one or more field types specified by the record classification rule;

transmit a plurality of status indicators corresponding to a plurality of groups of enterprise databases, wherein each group of enterprise databases shares at least one common attribute and wherein each status indicator is based at least in part on identified sensitive data records in each group of enterprise databases;

receive a selection of a status indicator in the plurality of status indicators, the status indicator corresponding to a group of enterprise databases in the plurality of groups of enterprise databases;

receive a selection of a protection policy, the protection policy configured to apply a data transformation to data associated with any data records that are linked to the protection policy; and apply the selected protection policy to the identified sensitive data records in the group of enterprise databases corresponding to the selected status indicator to link the identified sensitive data records in the group of enterprise databases with the selected protection policy.

9. The apparatus of claim 8, wherein the instructions that, when executed by at least one of the one or more processors, cause at least one of the one or more processors to apply the data transformation to identified sensitive data records in the group of enterprise databases further cause at least one of the one or more processors to:

identify a source database in the group of enterprise databases which provides the identified sensitive data records to other enterprise databases in the group of enterprise databases; and apply the selected protection policy to the identified sensitive data records on of the identified source database to link the identified sensitive data records in the identified source database with the selected protection policy.

10. The apparatus of claim 8, wherein each status indicator is based at least in part on at least one assessment score corresponding to at least one enterprise databases in each group of enterprise databases and wherein each assessment score is determined based on one or more of:
a number of identified sensitive data records in a corresponding enterprise database, a number of sensitive fields in the identified sensitive data records of the corresponding enterprise database, a number of dependent enterprise databases obtaining the identified sensitive data records from the corresponding enterprise database, a value of the identified sensitive data records of the corresponding enterprise database, whether a transformation corresponding to a protection policy has been applied to the identified sensitive data records of the corresponding enterprise database, or a record cost value corresponding to the sensitive data type of the identified sensitive data records.

11. The apparatus of claim 8, wherein an area of each status indicator corresponds to a a number of identified sensitive data records in the corresponding group of enterprise databases and wherein a color of each status indicator corresponds to an assessment score of the corresponding group of enterprise databases.

12. The apparatus of claim 8, wherein the instructions that, when executed by at least one of the one or more processors, cause at least one of the one or more processors to identify one or more sensitive data records having the sensitive data type based at least in part on header data corresponding to a plurality of data records stored on the plurality of enterprise and the one or more field types specified by the record classification rule further cause at least one of the one or more processors to:
identify one or more field classification rules specifying one or more character patterns corresponding to the one or more field types specified by the record classification rule;
retrieve header data corresponding to one or more data records sampled from an enterprise database;
apply pattern recognition rules to the header data using the character patterns of the one or more field classification rules to identify one or more fields in the one or more data records; and
identify the one or more data records as having the sensitive type based at least in part on a comparison of the identified one or more fields and the one or more field types specified by the record classification rule.

13. The apparatus of claim 12, wherein the one or more records comprise a plurality of data records, wherein the pattern recognition rules are applied to the header data using the character patterns of the one or more field classification rules to identify one or more fields in the plurality of data records, and wherein the instructions that, when executed by at least one of the one or more processors, cause at least one of the one or more processors to identify the one or more data records as having the sensitive type based at least in part on a comparison of the identified one or more fields and the one or more field types specified by the record classification rule further cause at least one of the one or more processors to:

determine a quantity of data records in the plurality of records having identified fields matching the one or more field types specified by the record classification rule; and
identify the plurality of data records as having the sensitive type based at least in part on a determination that the quantity of data records exceeds a verification threshold.

14. The apparatus of claim 8, wherein the data transformation comprises one or more of:
a persistent masking transformation configured to mask stored data in the identified sensitive data records;
a dynamic masking transformation configured to selectively mask data requested from the identified sensitive data records;
a blocking transformation configured to transform permissions associated with the identified sensitive data records;
an encryption transformation configured to encrypt data associated with the identified sensitive data records; or
a tokenization transformation configured to tokenize data associated with the identified sensitive data records.

15. At least one non-transitory computer-readable medium storing computer-readable instructions that, when executed by one or more computing devices, cause at least one of the one or more computing devices to:
receive a record classification rule configured to identify sensitive records having a sensitive data type stored on a plurality of enterprise databases, wherein the record classification rule specifies one or more field types;
identify sensitive data records having the sensitive data type based at least in part on header data corresponding to a plurality of data records stored on the plurality of enterprise databases and the one or more field types specified by the record classification rule;
transmit a plurality of status indicators corresponding to a plurality of groups of enterprise databases, wherein each group of enterprise databases shares at least one common attribute and wherein each status indicator is based at least in part on identified sensitive data records in each group of enterprise databases;
receive a selection of a status indicator in the plurality of status indicators, the status indicator corresponding to a group of enterprise databases in the plurality of groups of enterprise databases;
receive a selection of a protection policy, the protection policy configured to apply a data transformation to data associated with any data records that are linked to the protection policy; and
apply the selected protection policy to the identified sensitive data records in the group of enterprise databases corresponding to the selected status indicator to link the identified sensitive data records in the group of enterprise databases with the selected protection policy.

16. The at least one non-transitory computer-readable medium of claim of claim 15, wherein the instructions that, when executed by at least one of the one or more computing devices, cause at least one of the one or more computing devices to apply the data transformation to identified sensitive data records in the group of enterprise databases further cause at least one of the one or more computing devices to:
identify a source database in the group of enterprise databases which provides the identified sensitive data records to other enterprise databases in the group of enterprise databases; and
apply the selected protection policy to the identified sensitive data records on ef the identified source database to link the identified sensitive data records in the identified source database with the selected protection policy.

17. The at least one non-transitory computer-readable medium of claim of claim 15, wherein each status indicator is based at least in part on at least one assessment score corresponding to at least one enterprise databases in each group of enterprise databases and wherein each assessment score is determined based on one or more of:
a number of identified sensitive data records in a corresponding enterprise database, a number of sensitive fields in the identified sensitive data records of the corresponding enterprise database, a number of dependent enterprise databases obtaining the identified sensitive data records from the corresponding enterprise database, a value of the identified sensitive data records of the corresponding enterprise database, whether a transformation corresponding to a protection policy has been applied to the identified sensitive data records of the corresponding enterprise database, or a record cost value corresponding to the sensitive data type of the identified sensitive data records.

18. The at least one non-transitory computer-readable medium of claim of claim 15, wherein an area of each status indicator corresponds to a a number of identified sensitive data records in the corresponding group of enterprise databases and wherein a color of each status indicator corresponds to an assessment score of the corresponding group of enterprise databases.

19. The at least one non-transitory computer-readable medium of claim of claim 15, wherein the instructions that, when executed by at least one of the one or more computing devices, cause at least one of the one or more computing devices to identify one or more sensitive data records having the sensitive data type based at least in part on header data corresponding to a plurality of data records stored on the plurality of enterprise and the one or more field types specified by the record classification rule further cause at least one of the one or more computing devices to:
identify one or more field classification rules specifying one or more character patterns corresponding to the one or more field types specified by the record classification rule;
retrieve header data corresponding to one or more data records sampled from an enterprise database;
apply pattern recognition rules to the header data using the character patterns of the one or more field classification rules to identify one or more fields in the one or more data records; and
identify the one or more data records as having the sensitive type based at least in part on a comparison of the identified one or more fields and the one or more field types specified by the record classification rule.

20. The at least one non-transitory computer-readable medium of claim of claim 19, wherein the one or more records comprise a plurality of data records, wherein the pattern recognition rules are applied to the header data using the character patterns of the one or more field classification rules to identify one or more fields in the plurality of data records, and wherein the instructions that, when executed by at least one of the one or more computing devices, cause at least one of the one or more computing devices to identify the one or more data records as having the sensitive type based at least in part on a comparison of the identified one or more fields and the one or more field types specified by the record classification rule further cause at least one of the one or more computing devices to:
determine a quantity of data records in the plurality of records having identified fields matching the one or more field types specified by the record classification rule; and
identify the plurality of data records as having the sensitive type based at least in part on a determination that the quantity of data records exceeds a verification threshold.

21. The at least one non-transitory computer-readable medium of claim of claim 15, wherein the data transformation comprises one or more of:
a persistent masking transformation configured to mask stored data in the identified sensitive data records;
a dynamic masking transformation configured to selectively mask data requested from the identified sensitive data records;
a blocking transformation configured to transform permissions associated with the identified sensitive data records;
an encryption transformation configured to encrypt data associated with the identified sensitive data records; or
a tokenization transformation configured to tokenize data associated with the identified sensitive data records.

* * * * *